US012698836B2

(12) United States Patent
Determan et al.

(10) Patent No.: US 12,698,836 B2
(45) Date of Patent: Aug. 4, 2026

(54) PRESS TO SPECIFICATION SOLENOID VALVE ASSEMBLY

(71) Applicant: ASCO, L.P., Florham Park, NJ (US)

(72) Inventors: Alexander R. Determan, Grand Blanc, MI (US); Matthew Tyler Hoskins, Oak Park, MI (US)

(73) Assignee: ASCO, L.P., Florham Park, NJ (US)

( * ) Notice: Subject to any disclaimer, the term of this patent is extended or adjusted under 35 U.S.C. 154(b) by 0 days.

(21) Appl. No.: 18/590,945

(22) Filed: Feb. 29, 2024

(65) Prior Publication Data

US 2025/0277530 A1     Sep. 4, 2025

(51) Int. Cl.
| | |
|---|---|
| *F16K 37/00* | (2006.01) |
| *F16K 1/52* | (2006.01) |
| *F16K 27/04* | (2006.01) |
| *F16K 31/06* | (2006.01) |
| *F16K 27/02* | (2006.01) |

(52) U.S. Cl.
CPC ............ *F16K 1/52* (2013.01); *F16K 31/0627* (2013.01); *F16K 31/0675* (2013.01); *F16K 37/0041* (2013.01); *F16K 37/005* (2013.01); *F16K 37/0075* (2013.01); *F16K 37/0083* (2013.01); *F16K 37/0091* (2013.01); *F16K 1/523* (2013.01); *F16K 27/029* (2013.01); *F16K 27/048* (2013.01)

(58) Field of Classification Search
USPC ..................... 251/129.15; 137/15.17, 315.03
See application file for complete search history.

(56) References Cited

U.S. PATENT DOCUMENTS

| | | | | |
|---|---|---|---|---|
| 4,074,700 A | * | 2/1978 | Engle .................. | F16K 31/0627 |
| | | | | 251/282 |
| 4,530,486 A | * | 7/1985 | Rusnak ............... | F16K 31/0668 |
| | | | | 137/881 |
| 4,535,519 A | * | 8/1985 | Kajikawa ............... | B21K 21/00 |
| | | | | 29/890.132 |
| 4,552,179 A | | 11/1985 | Tarusawa et al. | |
| 4,863,142 A | * | 9/1989 | Hendrixon ................ | H01F 7/13 |
| | | | | 251/129.08 |
| 4,919,390 A | * | 4/1990 | Ichiryu .................. | H01F 7/1607 |
| | | | | 335/297 |
| 5,897,098 A | | 4/1999 | Nishinosono et al. | |
| 5,918,635 A | * | 7/1999 | Wang .................. | F16K 31/0693 |
| | | | | 137/625.65 |
| 5,996,628 A | * | 12/1999 | Najmolhoda ....... | F16K 31/0613 |
| | | | | 251/129.08 |

(Continued)

OTHER PUBLICATIONS

Drawing LHDA0571215H, Rev. A, Title: HDI-FMT-QT-3W-5V-15PSI-FKM, The Lee Company on Nov. 1, 2010.

(Continued)

*Primary Examiner* — Matthew W Jellett
(74) *Attorney, Agent, or Firm* — Mackey Law Firm PLLC

(57)     ABSTRACT
A method of assembling a valve can include monitoring a first fluid flow between a first port and a second port of the valve and/or pressing a poppet onto a plunger of the valve until the first fluid flow stops. The method can include monitoring a second fluid flow between the first port and a third port of the valve, energizing a coil of the valve, and pressing a cap into a body of the valve until the second fluid flow stops or until a target rate of the second fluid flow is achieved.

20 Claims, 17 Drawing Sheets

(56) References Cited

U.S. PATENT DOCUMENTS

| | | | |
|---|---|---|---|
| 6,546,959 B2 | 4/2003 | Cross et al. | |
| 6,669,166 B2* | 12/2003 | Enomoto | F02M 63/0225 |
| | | | 417/273 |
| 6,745,790 B2 | 6/2004 | Sato et al. | |
| 6,749,175 B2 | 6/2004 | Sato et al. | |
| 6,932,320 B2 | 8/2005 | Fukano et al. | |
| 7,106,158 B2 | 9/2006 | Forsythe et al. | |
| 7,369,023 B2* | 5/2008 | Frank | F16K 31/0658 |
| | | | 335/279 |
| 7,458,395 B2* | 12/2008 | Haynes | F16K 31/0606 |
| | | | 251/129.08 |
| 7,468,647 B2 | 12/2008 | Ishibashi et al. | |
| 7,766,037 B2* | 8/2010 | Moenkhaus | F16K 31/0655 |
| | | | 251/285 |
| 8,109,487 B2* | 2/2012 | Kokubu | H01F 7/1607 |
| | | | 335/279 |
| 8,261,424 B1* | 9/2012 | Thomeczek | B23P 11/00 |
| | | | 29/520 |
| 8,576,032 B2* | 11/2013 | Herbert | F16K 37/0041 |
| | | | 335/220 |
| 8,651,141 B2 | 2/2014 | Giacomini et al. | |
| 8,991,435 B2* | 3/2015 | Schulz | F16L 55/11 |
| | | | 29/520 |
| 9,016,663 B2* | 4/2015 | Moreno | F16K 31/0675 |
| | | | 251/129.15 |
| 9,195,229 B2* | 11/2015 | Stokes | G05B 23/0256 |
| 9,371,933 B2* | 6/2016 | Nitta | F16K 31/0665 |
| 9,631,736 B2* | 4/2017 | Kus | F16K 31/0651 |
| 9,903,498 B2* | 2/2018 | Takanishi | F16K 27/041 |
| 10,041,603 B2* | 8/2018 | Boban | F16K 3/0218 |
| 10,125,890 B2 | 11/2018 | Bahr | |
| 10,388,446 B2 | 8/2019 | Ott | |
| 10,895,330 B2* | 1/2021 | Haeusser | F16K 31/0665 |
| 11,110,904 B2* | 9/2021 | Dinerman | B60T 15/025 |
| 11,137,086 B2* | 10/2021 | Chang | F16K 31/0627 |
| 11,215,293 B2* | 1/2022 | Fukuda | F04B 53/10 |
| 11,293,564 B2* | 4/2022 | Hoskins | F16K 17/0433 |
| 11,788,629 B2* | 10/2023 | Bezold | F16J 15/106 |
| | | | 251/129.15 |
| 11,885,430 B2* | 1/2024 | Roche | F16K 31/0689 |
| 12,241,558 B2* | 3/2025 | Favreau | F16K 15/063 |
| 2001/0037832 A1 | 11/2001 | Weiss et al. | |

| | | | |
|---|---|---|---|
| 2002/0000530 A1* | 1/2002 | Kumar | H01F 7/1638 |
| | | | 251/129.17 |
| 2002/0079004 A1 | 6/2002 | Sato et al. | |
| 2003/0189183 A1 | 10/2003 | Noller et al. | |
| 2004/0163721 A1 | 8/2004 | Cotton, III et al. | |
| 2005/0051749 A1 | 3/2005 | Lee | |
| 2005/0269538 A1 | 12/2005 | Haynes et al. | |
| 2006/0108551 A1 | 5/2006 | Yoshimura et al. | |
| 2009/0039302 A1 | 2/2009 | Giacomini et al. | |
| 2010/0155638 A1 | 6/2010 | Zurke | |
| 2010/0326552 A1 | 12/2010 | Suzuki et al. | |
| 2012/0326065 A1 | 12/2012 | Ferguson et al. | |
| 2013/0146796 A1 | 6/2013 | Karl | |
| 2013/0264507 A1 | 10/2013 | Schneiker et al. | |
| 2013/0284960 A1* | 10/2013 | Schnelker | F16K 31/0658 |
| | | | 251/129.15 |
| 2014/0175312 A1 | 6/2014 | Jamison et al. | |
| 2015/0102243 A1 | 4/2015 | Timmermans et al. | |
| 2017/0146148 A1 | 5/2017 | Kim et al. | |
| 2018/0056954 A1 | 3/2018 | Killmann et al. | |
| 2019/0108934 A1 | 4/2019 | Nagasaki et al. | |
| 2020/0114479 A1* | 4/2020 | Ueno | F16K 31/0613 |
| 2020/0208753 A1 | 7/2020 | Hoppe | |
| 2020/0240536 A1* | 7/2020 | Williams | F16K 1/50 |
| 2021/0327626 A1 | 10/2021 | Sasao et al. | |
| 2022/0003332 A1 | 1/2022 | Roche et al. | |
| 2022/0042619 A1 | 2/2022 | Bailey et al. | |
| 2022/0221073 A1 | 7/2022 | Favreau | |
| 2022/0325816 A1 | 10/2022 | Sadiku et al. | |
| 2023/0125219 A1 | 4/2023 | Di Dio et al. | |

OTHER PUBLICATIONS

Drawing LHDA0581215H, Rev. A, Title: HDI-PTD-QT-3W-5V-15PSI-FKM, The Lee Company on Nov. 1, 2010.
Drawing LHDA0561215H, Rev. A, Title: HDI-PI-QT-3W-5V-15 PSI-FKM, The Lee Company on Nov. 1, 2010.
ASCO General Service Solenoid Valves, 2/2 Series 210 brochure, Jan. 20, 2022.
BV10, Mac Valves Product Brochure, (https://www.macvalves.com), 2024.
LHD Series 3-Way Control Solenoid Valve, The Lee Company (https://www.theleeco.com/product/lhd-series-3-way-control-solenoid-valve/), 2024.

* cited by examiner

500

520

540

520

600

612

620

610

PRESS TO SPECIFICATION SOLENOID VALVE ASSEMBLY

CROSS-REFERENCE TO RELATED APPLICATIONS

This application is related to the commonly owned applications entitled "SOLENOID VALVE WITH BARBED SEALING ASSEMBLY," "VALVE WITH IMPROVED MAGNETIC FLUX INTERFACE," "SOLENOID VALVE POPPET AFFIXMENT," and "SOLENOID PLUNGER ALIGNMENT," respectively, each filed on the same day as the instant application, and the contents of which are incorporated herein by reference.

BACKGROUND OF THE INVENTION

Field of the Invention

The present disclosure relates generally to solenoid valves and more specifically relates to miniature solenoid valves.

Description of the Related Art

Solenoid valves typically have several components that are each manufactured to their own tolerances. As valves are assembled those tolerances can stack up, or add up, such that even properly assembled valves can experience flow variation, variation in leakage, and variation in pull-in or drop-out current. To mitigate against these effects, component tolerances can be tightened; however, this adds cost to the manufacture of the valve.

SUMMARY OF THE INVENTION

Applicants have created new and useful devices, systems and methods for solenoid valves. In at least one embodiment, a valve can include a valve body having a port section and a coil support section extending along a longitudinal axis, a plunger within the valve body and extending at least partially through the coil support section, a poppet press-fit onto the plunger, or any combination thereof. In at least one embodiment, the body can include a first valve seat. In at least one embodiment, the plunger can include a stem extending through the first valve seat into the port section. In at least one embodiment, the poppet can selectively engage the first valve seat to open and close a first flow path through the port section of the valve body. In at least one embodiment, a stroke of the plunger can be adjusted by adjusting a position of the poppet on the plunger. In at least one embodiment, a flow rate through the first flow path is configured to be adjusted by adjusting a position of the poppet on the plunger.

In at least one embodiment, the valve can include a cap press-fit at least partially into the port section of the valve body. In at least one embodiment, the cap can include a second valve seat that is configured to be selectively engaged by the poppet to selectively open and close a second flow path through the port section of the valve body. In at least one embodiment, the stroke of the plunger can be adjusted by adjusting a second position of the cap in the body. In at least one embodiment, a flow rate through the second flow path can be adjusted by adjusting a second position of the cap in the body.

In at least one embodiment, a method of assembling a valve can include monitoring a first flow, or fluid flow, between a first port and a second port of the valve and/or pressing a poppet onto a plunger of the valve until the first flow stops. In at least one embodiment, the method can include monitoring a second fluid flow between the first port and a third port of the valve, energizing a coil of the valve, pressing a cap into a body of the valve until the second fluid flow stops, or any combination thereof. In at least one embodiment, the method can include monitoring a second fluid flow between the first port and a third port of the valve and/or pressing a cap into a body of the valve until a target rate of the second fluid flow is achieved. In at least one embodiment, the first port is a common port, the second port is a normally closed port, and the third port is a normally open port.

In at least one embodiment, the method can include monitoring a power consumption of the coil and repeating the step of pressing the cap into the body, until the power consumption matches a setpoint. In at least one embodiment, the method can include energizing a coil of the valve, de-energizing the coil of the valve, monitoring for a sound caused by a plunger of the valve contacting a stop of the valve, or any combination thereof. In at least one embodiment, the method can include repeating, until the sound caused by the plunger contacting the stop is no longer detected, the steps of pressing the poppet onto the plunger, energizing the coil of the valve, de-energizing the coil of the valve, monitoring for the sound caused by the plunger contacting the stop, or any combination thereof.

In at least one embodiment, a method of assembling a valve can include monitoring a first flow between a common port and a normally closed port of the valve, pressing a poppet onto a plunger of the valve until the first flow stops, monitoring a second fluid flow between the common port and a normally open port of the valve, energizing a coil of the valve, pressing a cap into a body of the valve until the second fluid flow stops, or any combination thereof. In at least one embodiment, the method can include monitoring a power consumption of the coil and repeating the step of pressing the cap into the body, until the power consumption matches a setpoint. In at least one embodiment, the method can include energizing a coil of the valve, de-energizing the coil of the valve, monitoring for a sound caused by a plunger of the valve contacting a stop of the valve, or any combination thereof. In at least one embodiment, the method can include repeating, until the sound caused by the plunger contacting the stop is no longer detected, the steps of pressing the poppet onto the plunger, energizing the coil of the valve, de-energizing the coil of the valve, monitoring for the sound caused by the plunger contacting the stop, or any combination thereof. In at least one embodiment, the poppet can be pressed onto the plunger before the cap is pressed into the body.

In at least one embodiment, a method of assembling a valve can include monitoring a fluid flow between two or more ports of the valve, energizing a coil of the valve, pressing a cap into a body of the valve until the fluid flow stops, or any combination thereof. In at least one embodiment, the method can include monitoring a power consumption of the coil and repeating the step of pressing the cap into the body, until the power consumption matches a setpoint. In at least one embodiment, the method can include energizing a coil of the valve, de-energizing the coil of the valve, monitoring for a sound caused by a plunger of the valve contacting one or more other components, such as a stop of the valve, or any combination thereof. In at least one embodiment, the method can include repeating, until a sound caused by the plunger is no longer detected (or, e.g., falls below a threshold or within an acceptable range), the steps of pressing a poppet onto a plunger of the valve, energizing the coil of the valve, de-energizing the coil of the valve, monitoring for the sound caused by the plunger, or any combination thereof. In at least one embodiment, the poppet can be pressed onto the plunger before the cap is pressed into the body.

DETAILED DESCRIPTION OF THE INVENTION

Figure 1:
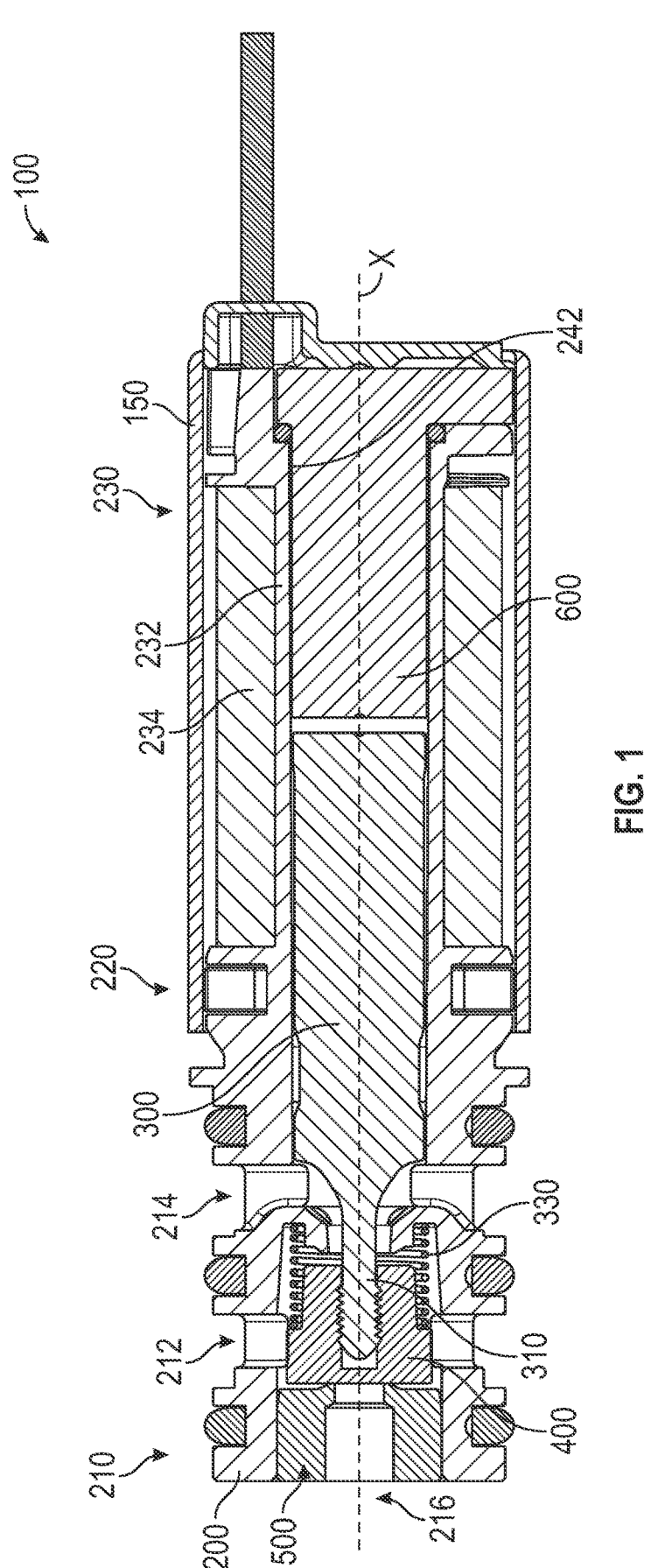
FIG. 1 is a cross sectional view of one of many embodiments of a solenoid valve according to the disclosure.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Any process flowcharts discussed herein illustrate the operation of possible implementations of systems, methods, and computer program products according to various embodiments of the present disclosure. In this regard, each block in a flowchart may represent a module, segment, or portion of code, which can comprise one or more executable instructions for implementing the specified logical function (s). It should also be noted that, in some implementations, the function(s) noted in the block(s) might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Applicants have created new and useful devices, systems and methods for solenoid valves. By press-fitting a poppet onto a plunger, press-fitting a cap into a valve body, press-fitting a stop into a valve body, or any combination thereof, manufacturing of the valve can be simplified, parts can be eliminated, costs can be reduced, operational adjustments can be made, and/or stacked tolerances can be reduced or eliminated.

Figure 2:
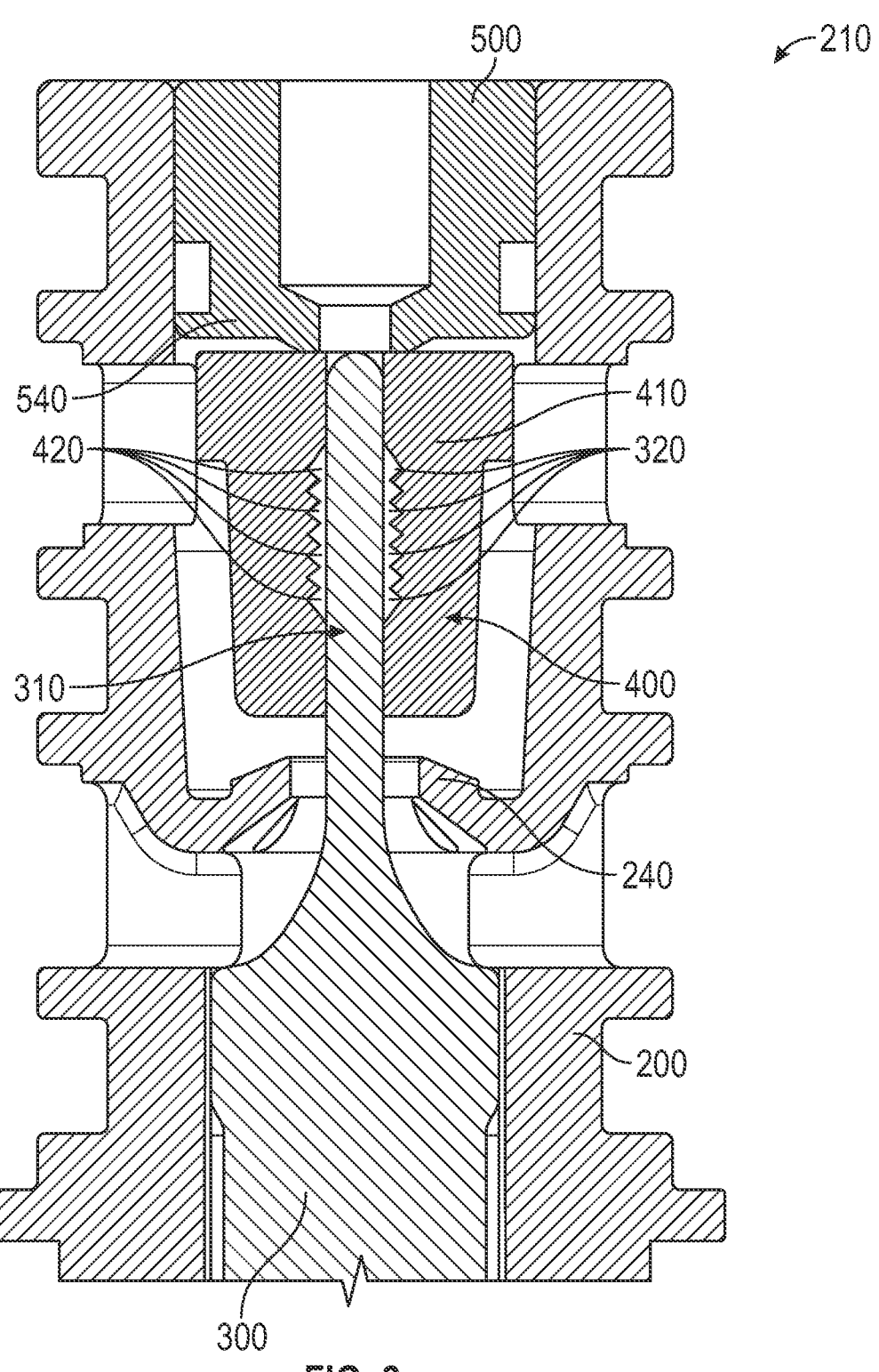
FIG. 2 is a cross sectional view of a portion of one of many embodiments of a solenoid valve according to the disclosure.
Figure 3:
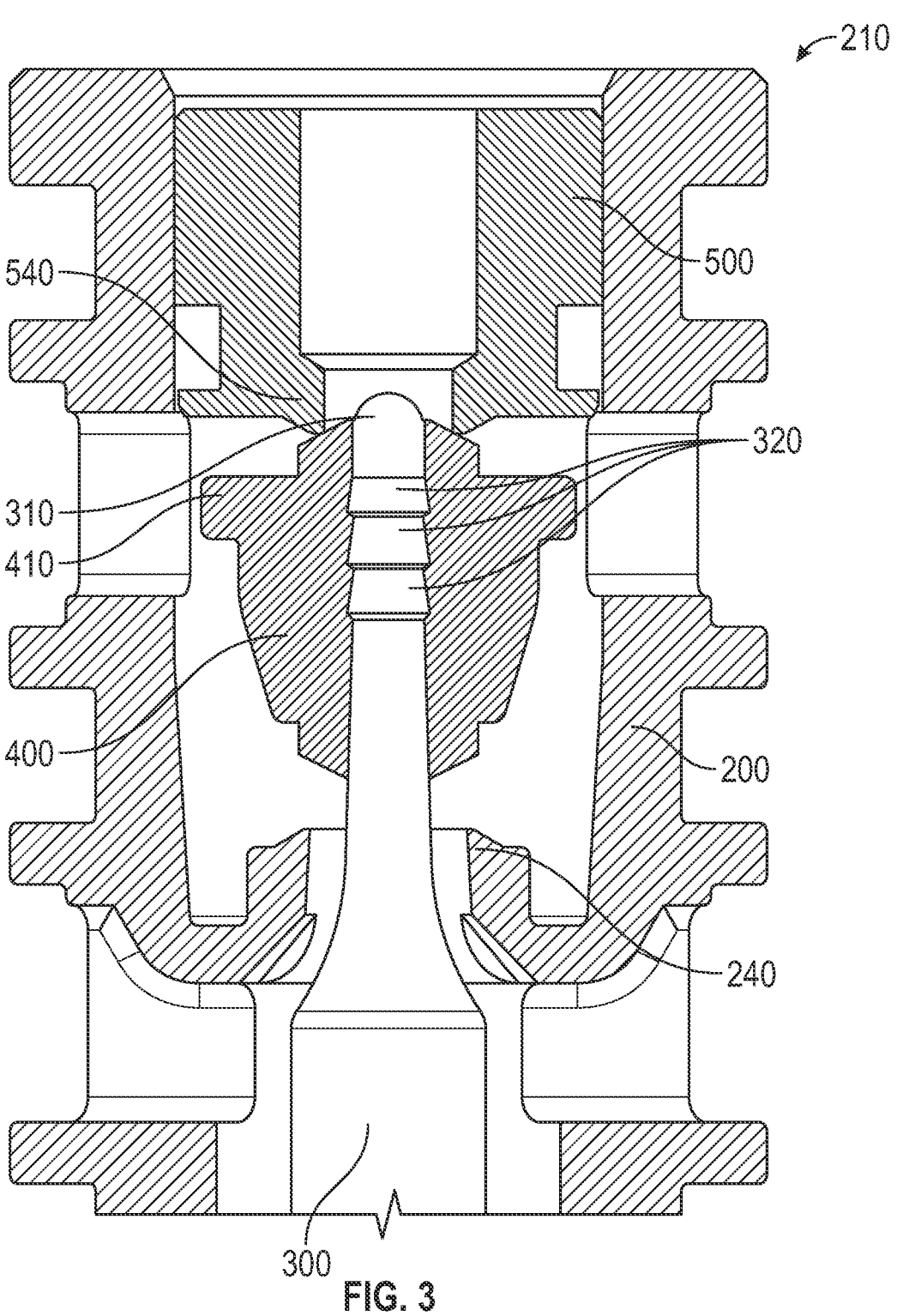
FIG. 3 is a cross sectional view of a portion of another one of many embodiments of a solenoid valve according to the disclosure.
Figure 4:
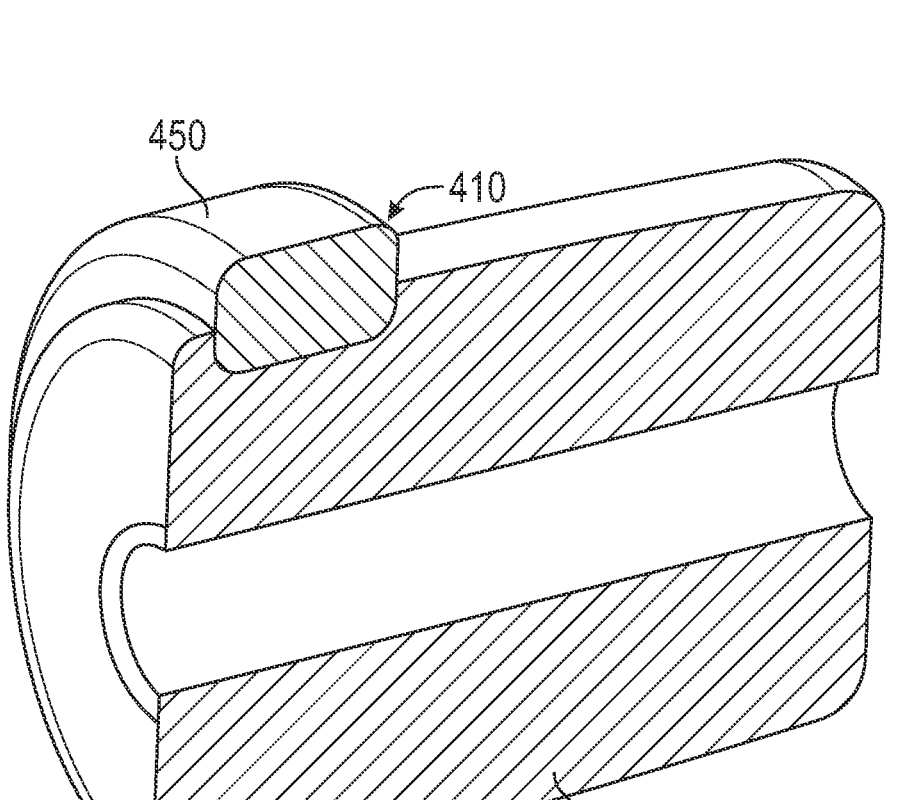
FIG. 4 is a cross sectional perspective view of one of many embodiments of a poppet according to the disclosure.
Figure 5:
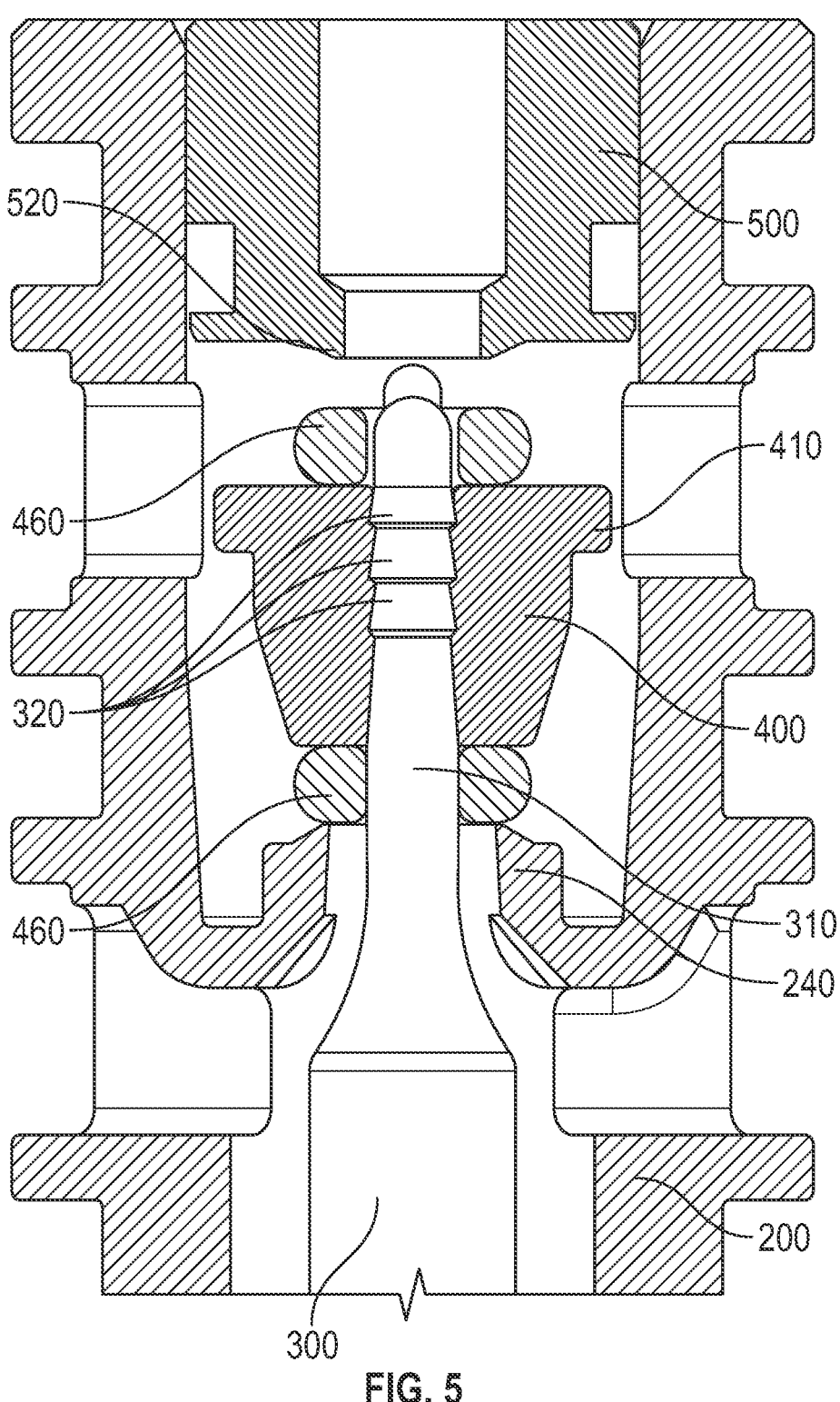
FIG. 5 is a cross sectional view of a portion of yet another one of many embodiments of a solenoid valve according to the disclosure.
Figure 6:
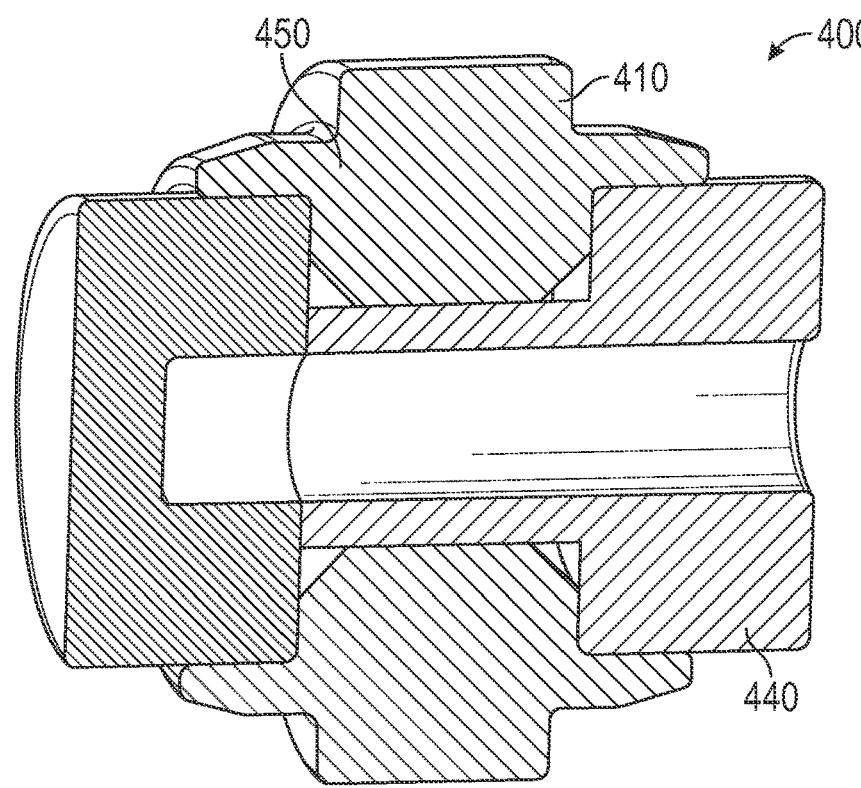
FIG. 6 is a cross sectional perspective view of another one of many embodiments of a poppet according to the disclosure.
Figure 7:
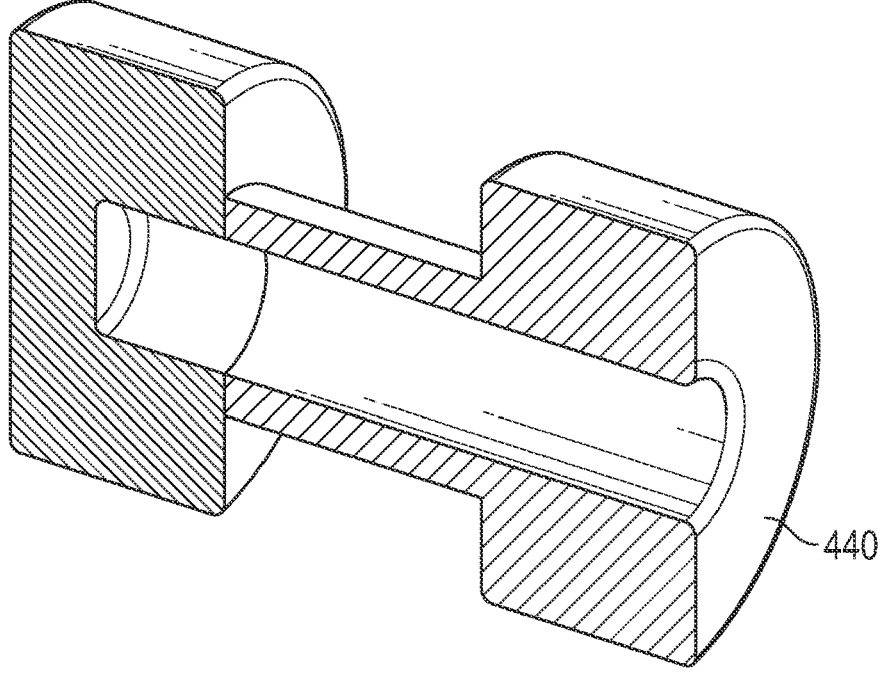
FIG. 7 is a cross sectional perspective view of a portion of the poppet of FIG. 6.
Figure 8:
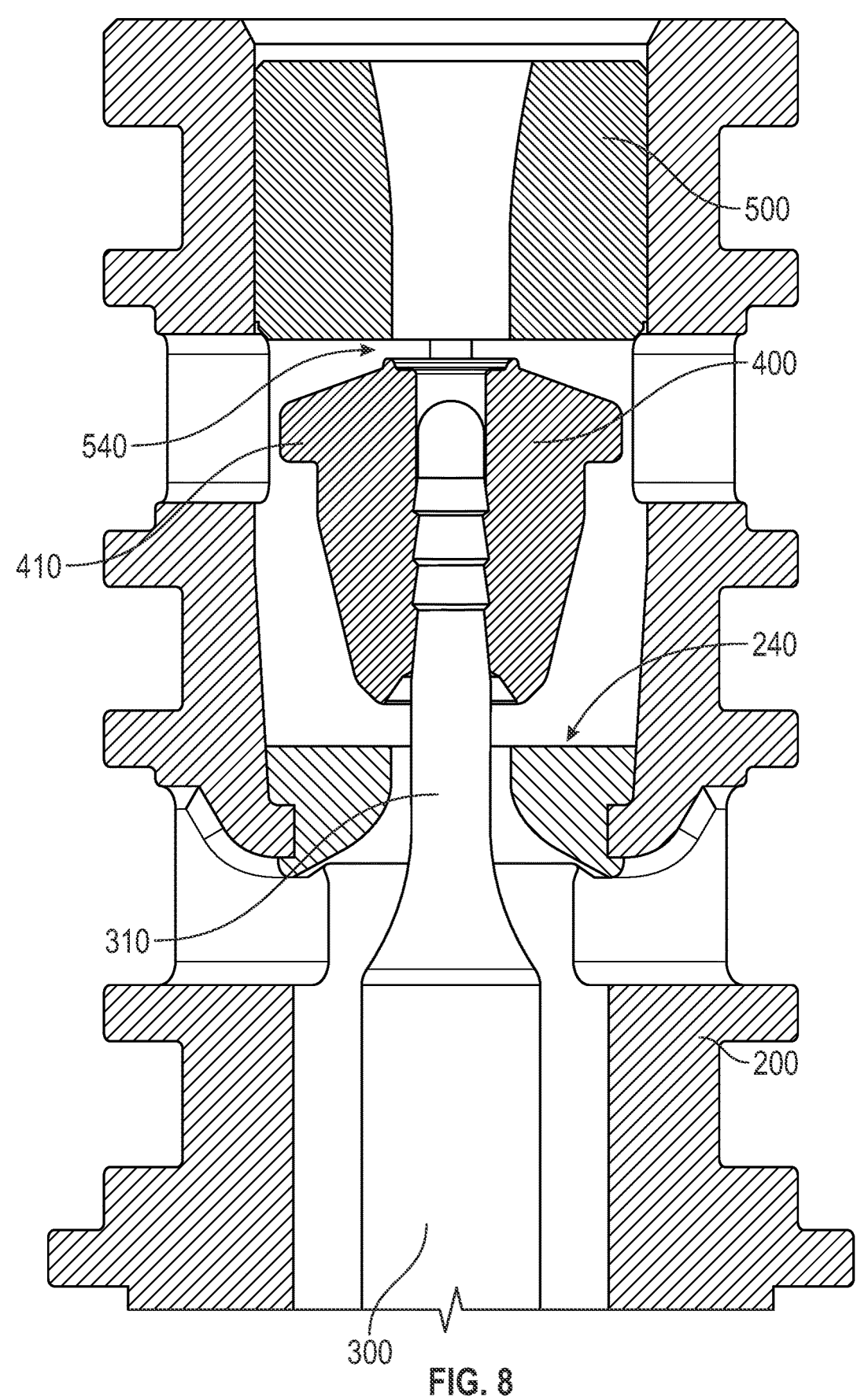
FIG. 8 is a cross sectional view of a portion of still another of many embodiments of a solenoid valve according to the disclosure.
Figure 9:
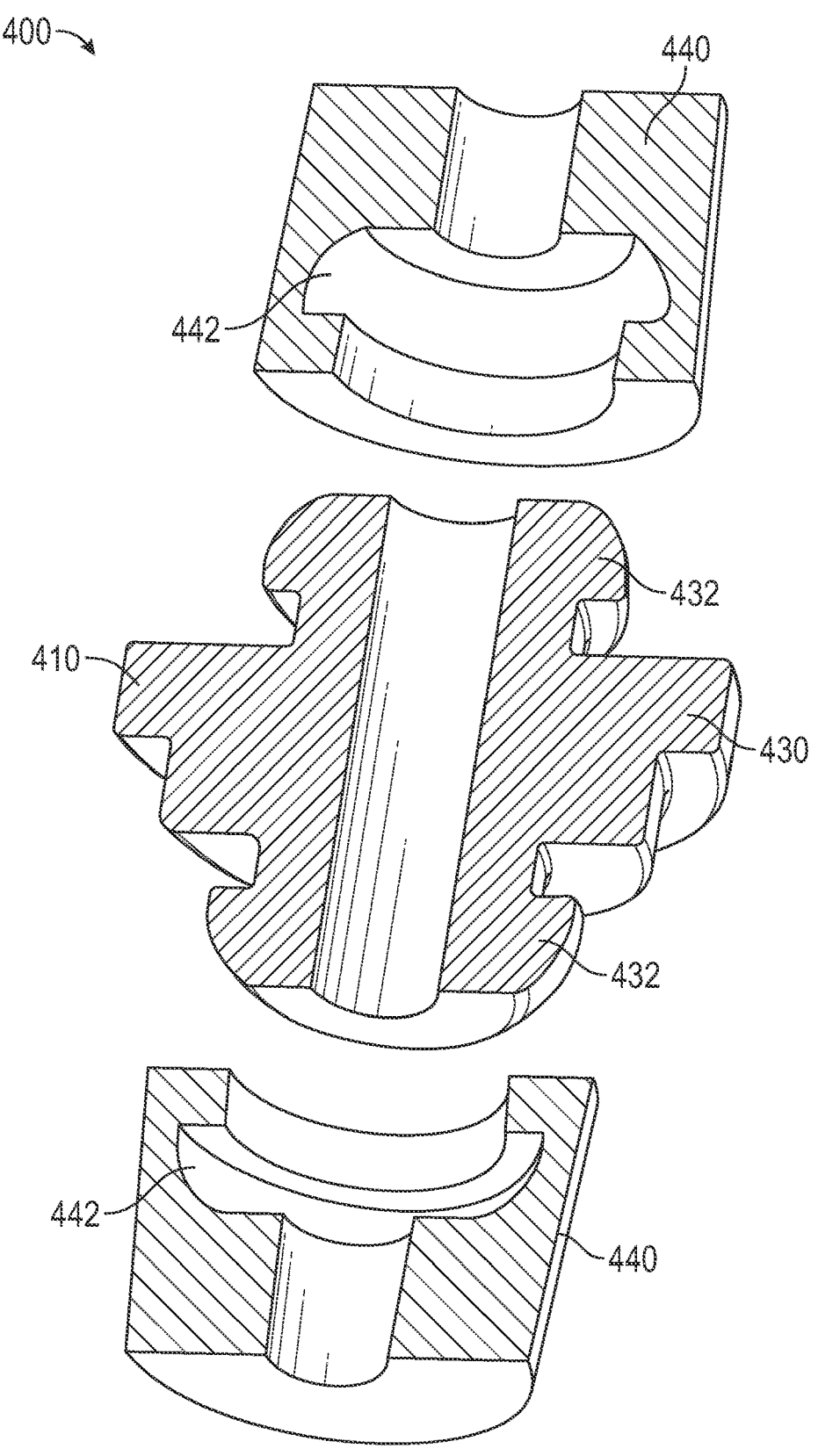
FIG. 9 is an exploded cross sectional view of a portion of one of many embodiments of a poppet according to the disclosure.
Figure 10:
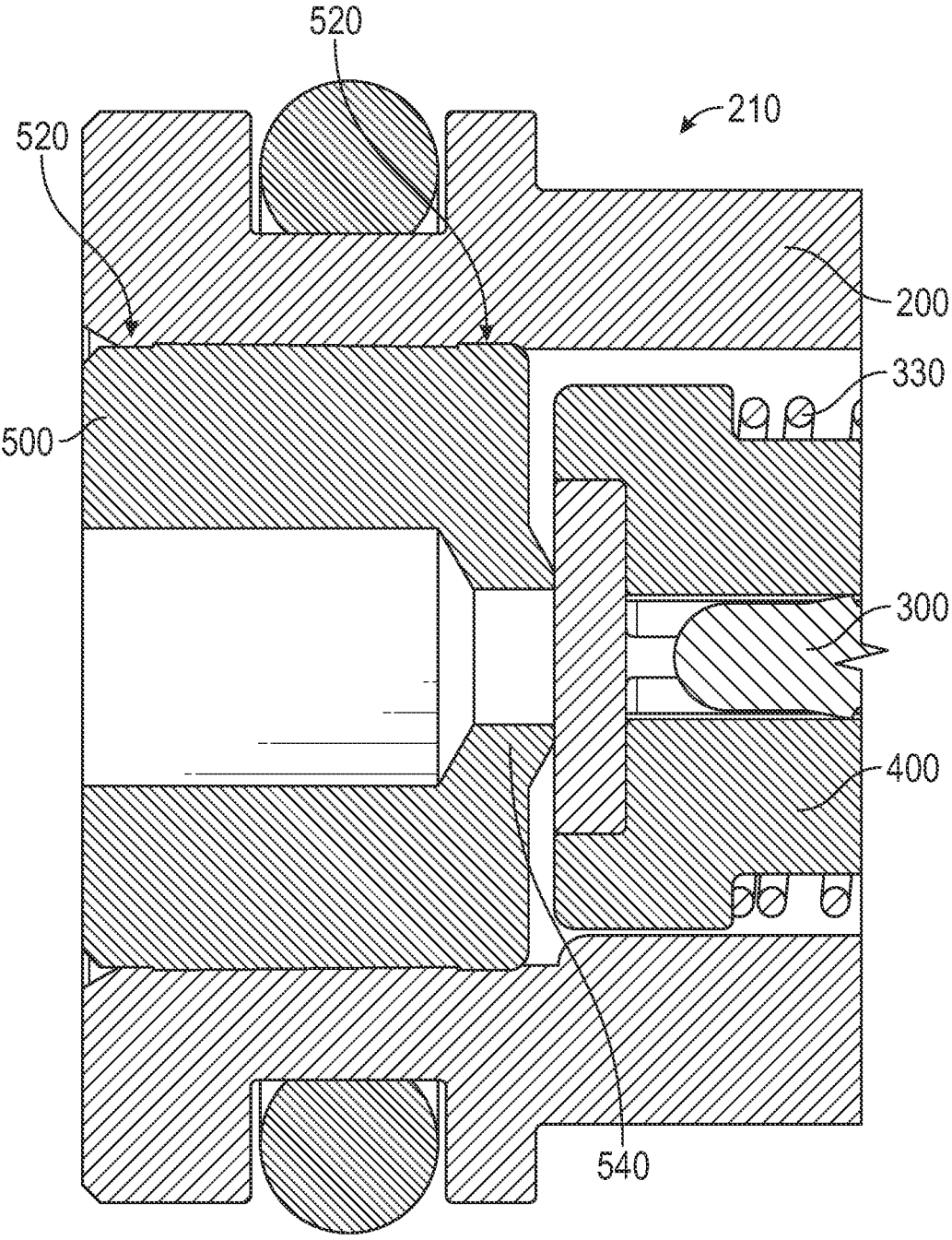
FIG. 10 is a cross sectional view of a portion of one of many embodiments of a solenoid valve according to the disclosure.
Figure 11:
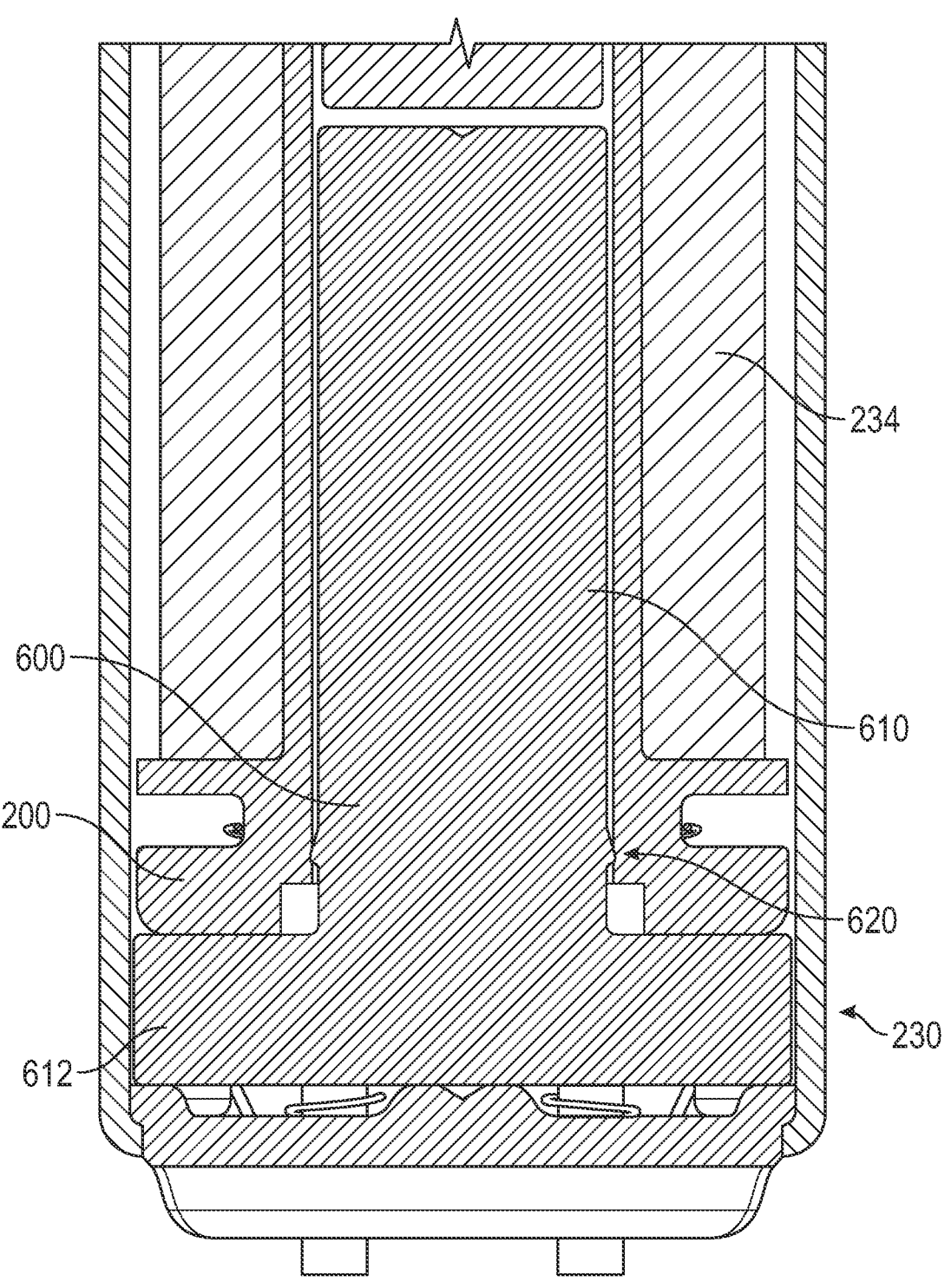
FIG. 11 is a cross sectional view of another portion of one of many embodiments of a solenoid valve according to the disclosure.
Figure 12:
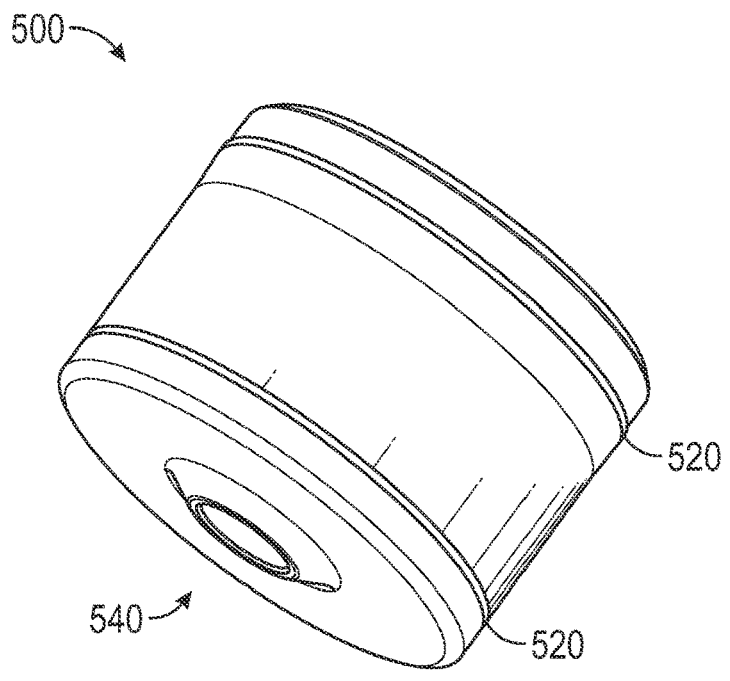
FIG. 12 is a perspective view of one of many embodiments of a cap according to the disclosure.
Figure 13:
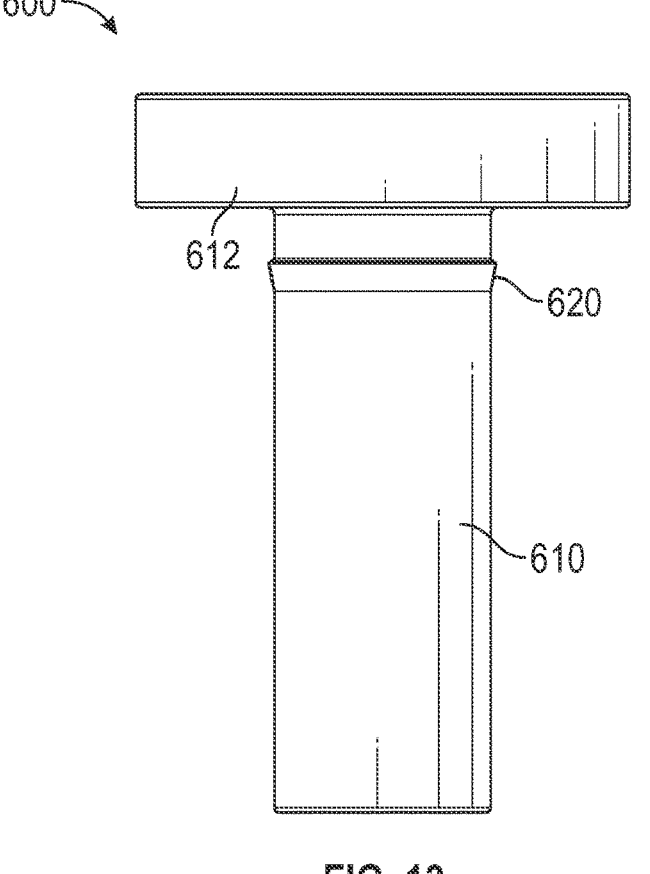
FIG. 13 is an elevation view of one of many embodiments of a stop according to the disclosure.
Figure 14:
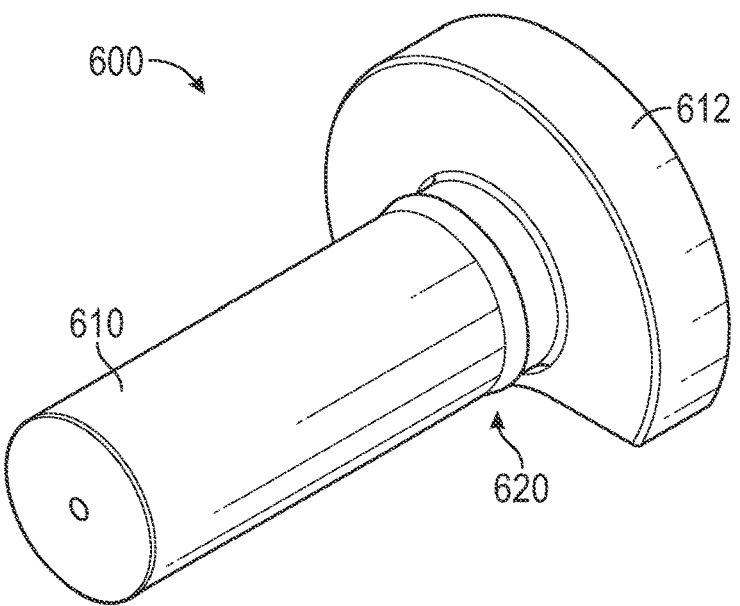
FIG. 14 is a perspective view of the stop of FIG. 13.
Figure 15:
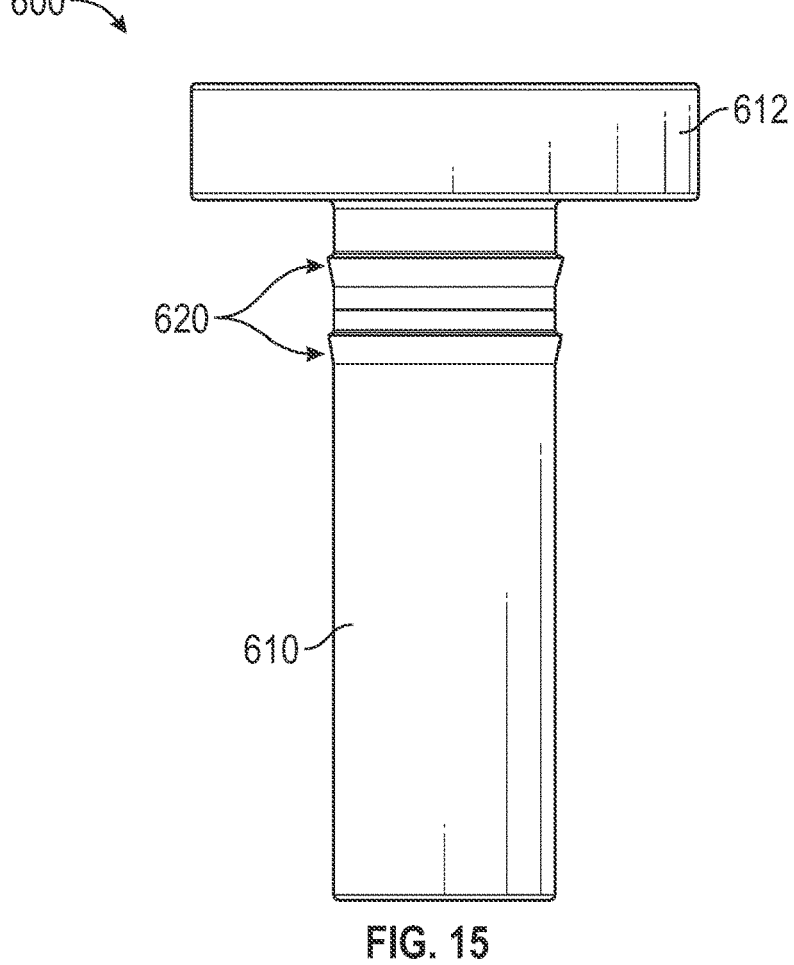
FIG. 15 is an elevation view of another one of many embodiments of a stop according to the disclosure.
Figure 16:
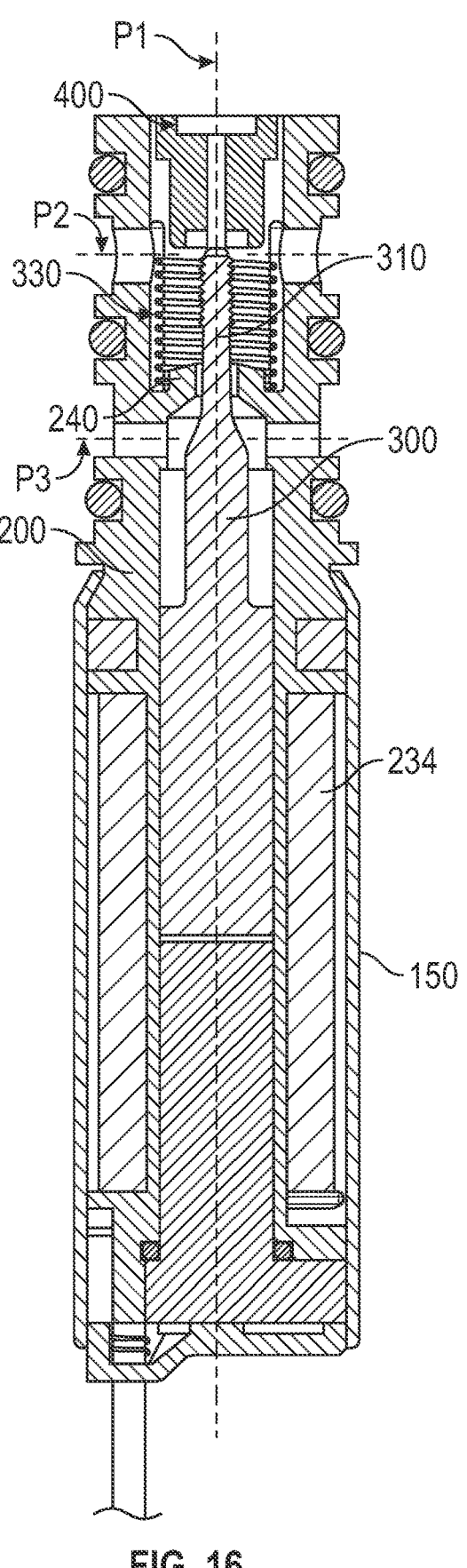
FIG. 16 is a cross sectional view illustrating one of many embodiments of an assembly method according to the disclosure, prior to the poppet being pressed onto the plunger.
Figure 17:
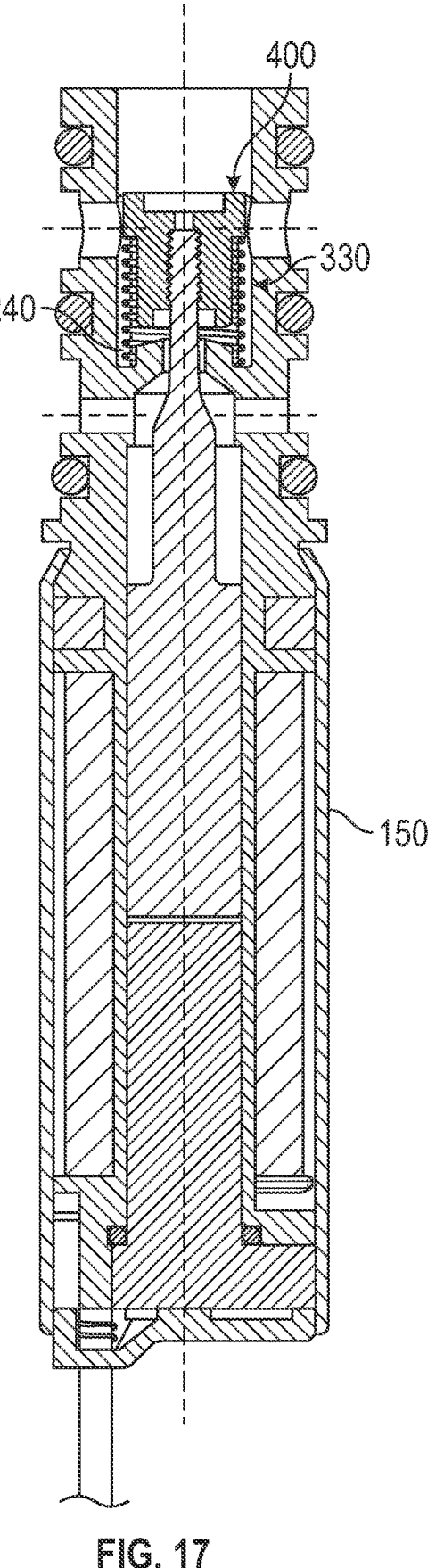
FIG. 17 is a cross sectional view illustrating another of many embodiments of an assembly method according to the disclosure, showing the poppet pressed onto the plunger.
Figure 18:
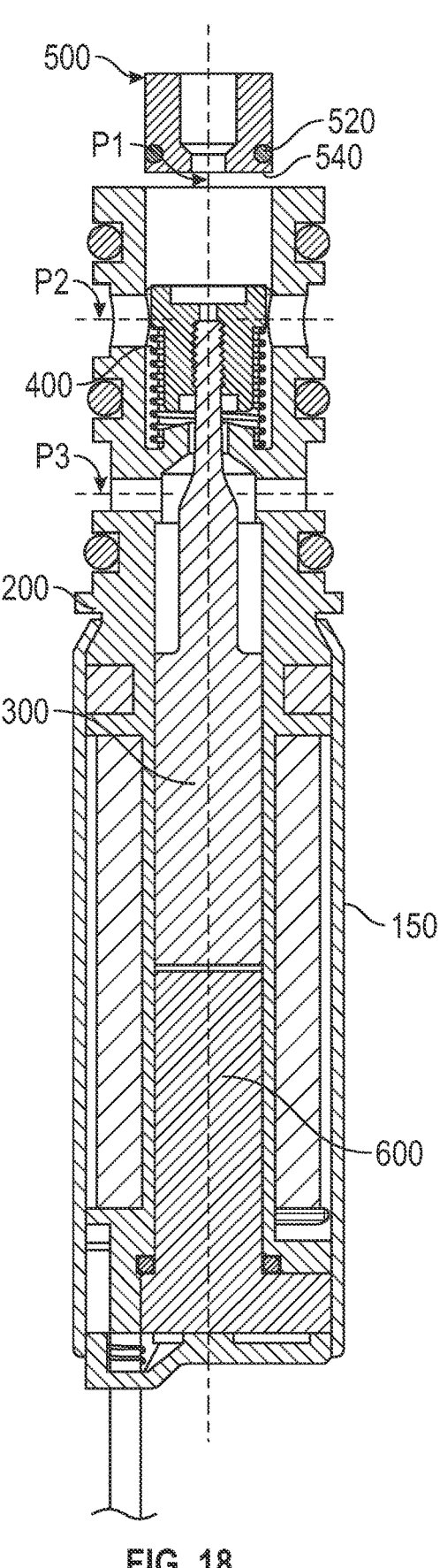
FIG. 18 is a cross sectional view illustrating yet another of many embodiments of an assembly method according to the disclosure, prior to the cap being pressed into the valve body.
Figure 19:
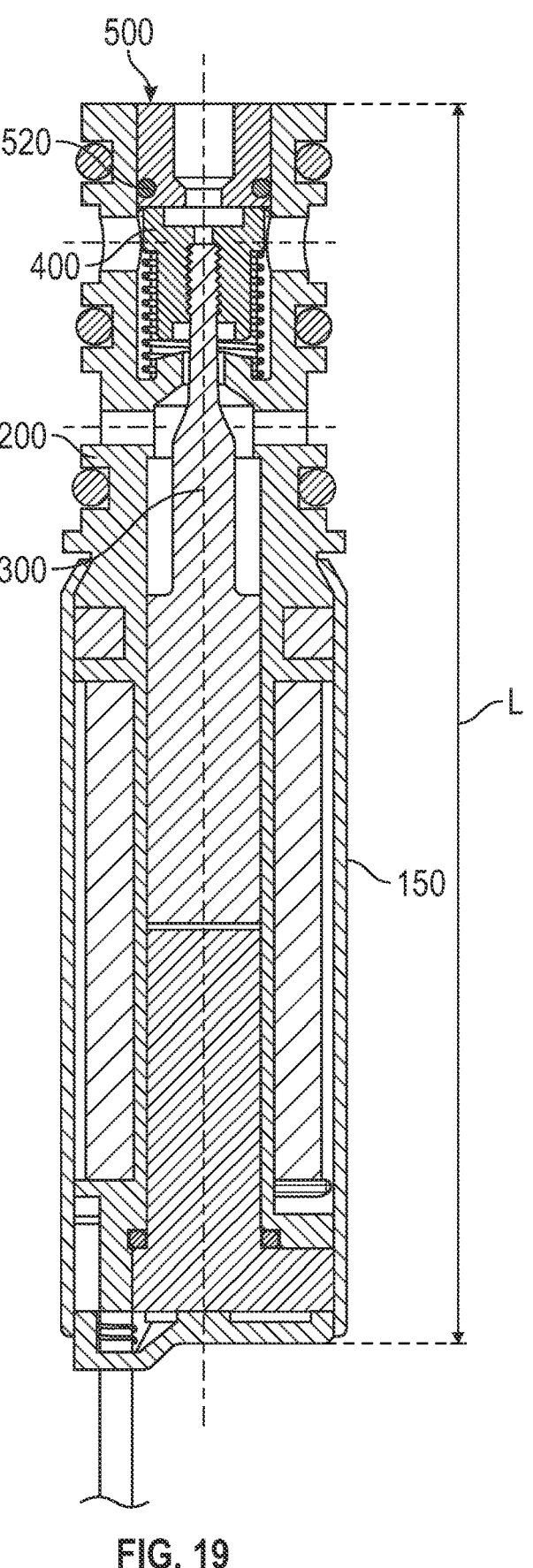
FIG. 19 is a cross sectional view illustrating still another of many embodiments of an assembly method according to the disclosure, showing the cap pressed into the valve body.
Figure 20:
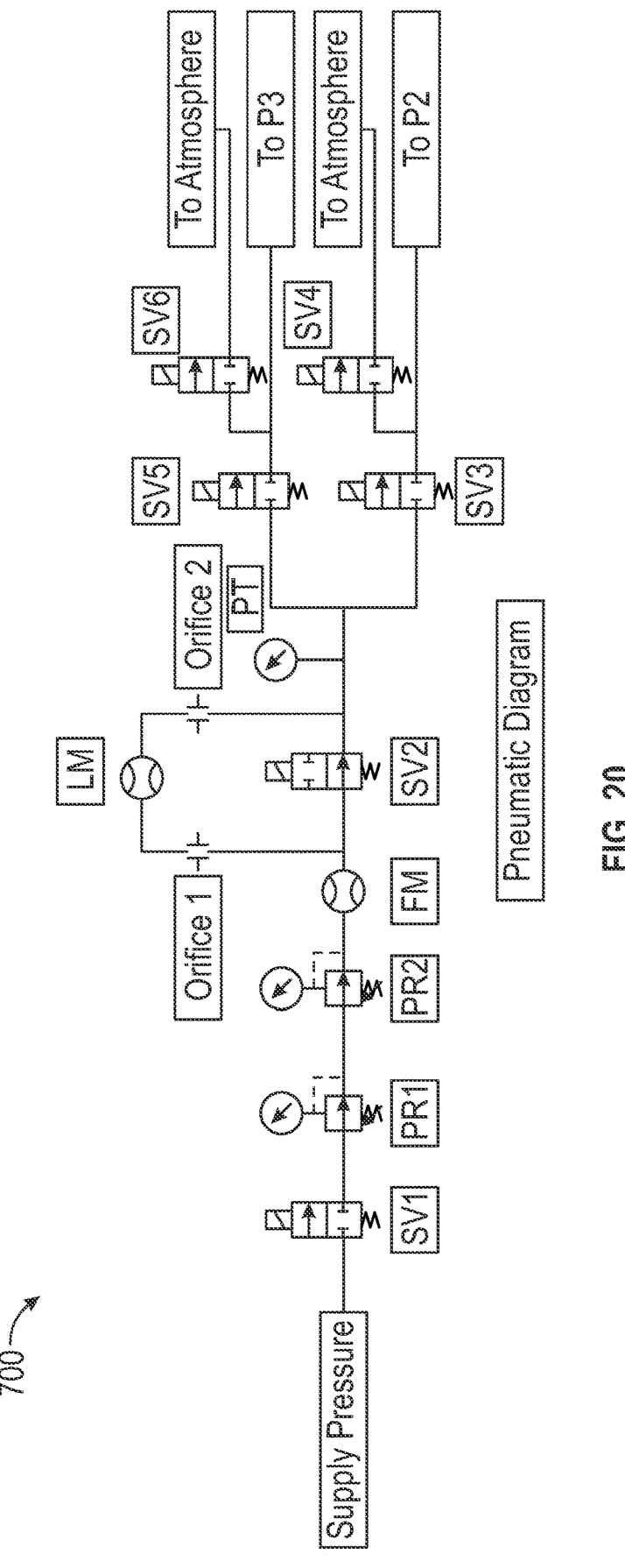
FIG. 20 is a pneumatic diagram of one of many embodiments of an assembly system according to the disclosure.

FIG. 1 is a cross sectional view of one of many embodiments of a solenoid valve according to the disclosure. FIG. 2 is a cross sectional view of a portion of one of many embodiments of a solenoid valve according to the disclosure. FIG. 3 is a cross sectional view of a portion of another one of many embodiments of a solenoid valve according to the disclosure. FIG. 4 is a cross sectional perspective view of one of many embodiments of a poppet according to the disclosure. FIG. 5 is a cross sectional view of a portion of yet another one of many embodiments of a solenoid valve according to the disclosure. FIG. 6 is a cross sectional perspective view of another one of many embodiments of a poppet according to the disclosure. FIG. 7 is a cross sectional perspective view of a portion of the poppet of FIG. 6. FIG. 8 is a cross sectional view of a portion of still another of many embodiments of a solenoid valve according to the disclosure. FIG. 9 is an exploded cross sectional view of a portion of one of many embodiments of a poppet according to the disclosure. FIG. 10 is a cross sectional view of a portion of one of many embodiments of a solenoid valve according to the disclosure. FIG. 11 is a cross sectional view of another portion of one of many embodiments of a solenoid valve according to the disclosure. FIG. 12 is a perspective view of one of many embodiments of a cap according to the disclosure. FIG. 13 is an elevation view of one of many embodiments of a stop according to the disclosure. FIG. 14 is a perspective view of the stop of FIG. 13. FIG. 15 is an elevation view of another one of many embodiments of a stop according to the disclosure. FIG. 16 is a cross sectional view illustrating one of many embodiments of an assembly method according to the disclosure, prior to the poppet being pressed onto the plunger. FIG. 17 is a cross sectional view illustrating another of many embodiments of an assembly method according to the disclosure, showing the poppet pressed onto the plunger. FIG. 18 is a cross sectional view illustrating yet another of many embodiments of an assembly method according to the disclosure, prior to the cap being pressed into the valve body. FIG. 19 is a cross sectional view illustrating still another of many embodiments of an assembly method according to the disclosure, showing the cap pressed into the valve body. FIG. 20 is a pneumatic diagram of one of many embodiments of an assembly system according to the disclosure. FIGS. 1-20 are described in conjunction with one another.

In at least one embodiment, a valve 100 according to the disclosure, such as a miniature solenoid valve, can include one or more valve bodies 200, one or more plungers 300 disposed at least partially within the valve body 200, one or more poppets 400 coupled to the plunger 300, one or more end caps 500 coupled at least partially within the valve body 200, one or more stops 600 coupled at least partially within the valve body 200, or any combination thereof. In at least one embodiment, a valve 100 can include a shell 150 for housing or protecting one or more other components of the valve. In at least one embodiment, the poppet 400 can be press-fit onto the plunger 300. In at least one embodiment, the cap 500 and/or the stop 600 can limit movement of the plunger 300 and/or poppet 400. In at least one embodiment, the cap 500 and/or the stop 600 can be press-fit into the valve body 200.

In at least one embodiment, the valve body 200 can include one or more port sections 210, one or more flux collar support sections 220, one or more coil support sections 230, or any combination thereof, extending along one or more axes, such as a central longitudinal axis X. In at least one embodiment, the port section 210 can include one or more common ports 212, one or more normally open ports 214, and one or more normally closed ports 216, or any combination thereof. In at least one embodiment, the flux collar support section 220 can support a flux collar, such as to improve efficiency of the valve 100. In at least one embodiment, the port section 210, the flux collar support section 220, and the coil support section 230 of the valve body 200 can be a unitary or monolithic structure, such as by way of being portions of an integrally formed structure (e.g., an injection molded structure).

In at least one embodiment, the plunger 300 can extend at least partially through the flux collar support section 220 and the coil support section 230. In at least one embodiment, the plunger 300 can extend at least partially through a flux collar supported by the flux collar support section 220. In at least one embodiment, the plunger 300 can include one or more stems 310 that extend into the port section 210. In at least one embodiment, the plunger 300 can include one or more poppets 400 mounted to the stem 310. In at least one embodiment, one or more biasing members 330, such as a spring, can bias the plunger 300 and/or poppet 400 towards or away from one or more caps 500.

In at least one embodiment, the coil support section 230 of the valve body 200 can include one or more annular walls 232 and/or one or more coils 234. In at least one embodiment, the wall 232 can support coil 234, which can selectively actuate, or move, the plunger 300 against the force of the spring 330, to thereby switch the valve 100 from a normally open position to a normally closed position. In at least one embodiment, the coil support section 230 can include one or more stops 600, such as a core and/or related structure, to limit the movement of the plunger 300 in one or more directions within the bore 242. In at least one embodiment, the stop 600 can be a single, unitary structure. In at least one embodiment, the stop 600 can be or include a plurality of structures.

In at least one embodiment, a valve 100 according to the disclosure can include one or more a poppets 400 press-fit onto the plunger 300 and configured to selectively open and close at least one flow path through the port section 210 of the valve body 200. In at least one embodiment, the plunger 300 can include a stem 310 extending into the port section 210 of the valve body 200. In at least one embodiment, the poppet 400 can include one or more shoulders 410 against which the spring 330 can rest and thereby bias the poppet 400 towards a normal operating position, opening a normally open flow path and/or closing a normally closed flow path through the valve body 210. In at least one embodiment, the coil 234 can overcome the spring 330 to move the plunger 300 and poppet 400 to close a normally open flow path and/or open a normally closed flow path through the valve body 210.

In at least one embodiment, the poppet 400 can be press-fit onto the stem 310. In at least one embodiment, the stem 310 can include one or more annular barbs 320 configured to engage an interior of the poppet 400 to hold the poppet 400 in place on the stem 310. In at least one embodiment, the stem 310 can include one annular barb 320 configured to engage an interior of the poppet 400 to hold the poppet 400 in place on the stem 310. In at least one embodiment, the stem 310 can include a plurality of annular barbs 320 configured to engage an interior of the poppet 400 to hold the poppet 400 in place on the stem 310.

In at least one embodiment, the poppet 400 can include one or more annular grooves 420 configured to engage the barbs(s) 320 on the stem 310 to hold the poppet 400 in place on the stem 310. In at least one embodiment, the poppet 400 can include one annular groove 420 configured to engage the barbs(s) 320 on the stem 310 to hold the poppet 400 in place on the stem 310. In at least one embodiment, the poppet 400 can include a plurality of annular grooves 420 configured to engage the barbs(s) 320 on the stem 310 to hold the poppet 400 in place on the stem 310. In at least one embodiment, the annular barb(s) 320 and/or the annular groove(s) 420 allow a position of the poppet 400 with respect to the stem 310 to be adjusted, such that the poppet 400 can be mounted along a range of positions along the stem 310.

In at least one embodiment, the poppet 400 can be unitary or made of multiple portions. In at least one embodiment, the poppet 400 can include a more rigid portion 430 configured to engage the barb 320 on the stem 310. In at least one embodiment, the poppet 400 can include a more resilient portion configured to selectively engage one or more valve seats 240, 540 to selectively open and close the flow path through the port section 210 of the valve body 200. In at least one embodiment, with the rigid portion 430 being harder, or more rigid, than the resilient portion 440, the rigid portion 430 can better hold the poppet 400 in place along the stem 310 of the plunger 300. In at least one embodiment, with the resilient portion 440 being more resilient, softer, and/or more elastomeric than the rigid portion 430, the resilient portion 440 can better seal with the valve seats 240, 540. In at least one embodiment, the resilient portion 440 can be pulled at least partially into, thru, or onto the rigid portion 430. In at least one embodiment, the rigid portion 430 can include one or more annular flanges 432. In at least one embodiment, the resilient portion 440 can include one or more slots 442 configured to mate with the flange 432.

In at least one embodiment, the poppet 400 can include one or more bands 450 around a perimeter of the poppet 400 to secure the poppet 400 to the stem 310. In at least one embodiment, the poppet 400 can be pulled at least partially into, or thru, the band 450. In at least one embodiment, the band 450 can be metal and/or crimped onto the poppet 400, thereby securing the poppet 400 to the stem 310. In at least one embodiment, the band 450 can be a more rigid polymer than the poppet 400, or the resilient portion 440 thereof, thereby supporting and/or securing the poppet 400 to the stem 310.

In at least one embodiment, the poppet 400 can selectively engage one or more valve seats 240, 540 to selectively open and close one or more flow paths through the port section 210 of the valve body 200. In at least one embodiment, one or more valve seats 240 can be integral with the valve body 200 and/or can be part of a normally open or normally closed flow path. In at least one embodiment, one or more valve seats 540 can be integral with a cap 500 press-fit into one end of the valve body 200.

In at least one embodiment, the poppet 400 can include one or more seals 460, such as gasket(s) or O-ring(s), configured to selectively engage one or more valve seats 240, 540 to selectively open and close one or more flow path through the port section 210 of the valve body 200. In at least one embodiment, the poppet 400 can include a first seal 460 configured to selectively engage a first valve seat 540 to selectively open and close a normally closed flow path through the port section 210 of the valve body 200. In at least one embodiment, the poppet 400 can include a second seal 460 configured to selectively engage a second valve seat 240 to selectively open and close a normally open flow path through the port section 210 of the valve body 200. In at least one embodiment, the seal(s) 460 can be mounted to the poppet 400 and/or the stem 310, with the poppet 400 selectively pressing the seals(s) 460 into the valve seats 240, 540.

In at least one embodiment, portions of the valve body 200 and/or the cap 500 can be resilient. In at least one embodiment, all, or portions, of the poppet 400 can be rigid. In at least one embodiment, the poppet 400 can be rigid and configured to selectively engage a resilient valve seat 240, 540 to selectively open and close the flow path through the port section 210 of the valve body 200.

In at least one embodiment, a valve 100 according to the disclosure, such as a miniature solenoid valve, can include one or more valve bodies 200 having a port section 210 and a coil support section 230 extending along a longitudinal axis, one or more plungers 300 within the valve body 200 and extending at least partially through the coil support section 230, a poppet 400 including a resilient portion 440 configured to selectively engage a rigid valve seat 240, 540 to open and close at least one flow path through the port section 210 of the valve body 200, or any combination thereof. In at least one embodiment, the plunger 300 can include one or more stems 310 extending into the port section 210 of the valve body 200. In at least one embodiment, the stem 310 can include at least one annular barb 320 configured to engage an interior of the poppet 400 to hold the poppet 400 in place on the stem 310. In at least one embodiment, one or more of the valve seats 240 can be integral with the valve body 200. In at least one embodiment, one or more of the valve seats 540 can be integral with a cap 500 press-fit into one end of the valve body 200.

In at least one embodiment, the poppet 400 can include one or more rigid portions 430 configured to engage the barb 320 on the stem 310. In at least one embodiment, the rigid portion 430 can be harder than the resilient portion 440. In at least one embodiment, the rigid portion 430 can include one or more an annular flanges 432. In at least one embodiment, the resilient portion 440 can be configured to mate with the flange 432 and/or can include one or more slots 442 configured to mate with the flange 432.

In at least one embodiment, a valve 100 according to the disclosure, such as a miniature solenoid valve, can include one or more valve bodies 200 having a port section 210 and a coil support section 230 extending along a longitudinal axis, one or more plungers 300 within the valve body 200 and extending at least partially through the coil support section 230, one or more poppets 400 configured to selectively engage one or more valve seats 240, 540 to open and close one or more flow path through the port section 210 of the valve body 200, or any combination thereof. In at least one embodiment, the plunger 300 can include a stem 310 extending into the port section 210 of the valve body 200. In at least one embodiment, the stem 310 can include one or more annular barbs 320. In at least one embodiment, the barbs 320 can engage an interior of the poppet 400 to hold the poppet 400 in place on the stem 310.

By press-fitting the poppet 400 onto the stem 310 of the plunger 300, manufacturing of the valve 100 can be simplified, parts can be eliminated, costs can be reduced, operational adjustments can be made, and/or stacked tolerances can be reduced or eliminated. For example, a poppet body or holder can be eliminated. In at least one embodiment, the poppet 400 according to the disclosure does not require a complex and/or expensive over molding process. In at least one embodiment, the poppet 400 according to the disclosure can include a myriad of techniques, as described above, to provide adequate holding force, or resistance to pull-out, to remain in place on the plunger 300 for proper functionality within the valve 100. In at least one embodiment, the poppet 400 according to the disclosure can be a monolithic or unitary elastomeric, or otherwise resilient, structure with integral shoulder 410 for the spring 330 to provide a bias force against in order to operate the valve 100. In at least one embodiment, one or more of the barbs 320 and/or grooves 420 can be spiral, thereby allowing the poppet 400 according to the disclosure to be press-fit and/or threaded onto the stem 310, while still achieving many or all of the advantages discussed herein.

In at least one embodiment, an external surface of the stem 310 and/or an internal surface of the poppet 400 can be rough, or roughened, to increase static friction between the stem 310 and the poppet 400. In at least one embodiment, a dissolvable and/or evaporable lubricant can be used during assembly of the valve 100, such as to temporarily reduce friction between the stem 310 and the poppet 400. In at least one embodiment, an adhesive can be used to bond the stem 310 and the poppet 400. In at least one embodiment, the poppet 400 can include a through hole in order to inject an adhesive between the stem 310 and the poppet 400. In at least one embodiment, the poppet 400 can be designed to allow for transfer of heat or ultraviolet light to the adhesive between the stem 310 and the poppet 400. In at least one embodiment, the poppet 400 according to the disclosure can be vulcanized, hardened, shrunk, or any combination thereof once in place on the stem 310. In at least one embodiment, the poppet 400 according to the disclosure, or a portion thereof, can be metal and/or a rigid polymer and/or the valve seats 240, 540 can be metal and/or a rigid polymer, with the valve 100 relying on a metal-to-metal and/or metal-to-plastic seal, thereby eliminating elastomeric materials in sealing the flow path(s).

In at least one embodiment, a valve 100 according to the disclosure can include one or more caps 500 press-fit at least partially into the valve body 200 at an end of the valve body 200, such as at the port section 210 of the valve body. In at least one embodiment, the cap 500 can include one or more valve seats 540 that can be selectively engaged by the poppet 400 mounted to the plunger 300 to selectively open and close a flow path through the port section 210 of the valve body 200. In at least one embodiment, the cap 500 can include one or more annular barbs 520 that sealingly mate with the valve body 200. In at least one embodiment, the barb 520 can extend around a perimeter of the cap 500. In at least one embodiment, the barb 520 can resist pressure within the valve body 200 to hold the cap 500 in place within or relative to the valve body 500. In at least one embodiment, the annular barb(s) 520 can allow a position of the cap 500 within the valve body 200 to be adjusted, such that the cap 500 can be mounted along a range of positions along the valve body 200. Adjusting the position of the cap 500 within or relative to the valve body 200 can adjust the stroke of the plunger 300, one or more flow rates through the port section 210 of the valve body, reduce stacked tolerances in the valve 100, or any combination thereof.

In at least one embodiment, the barb 520 can be integral with the cap 500 and/or can hermetically or fluidically seal the cap 500 to the valve body 200, which can include doing so without any additional sealing device, such as an O-ring, gasket, or sealant. In at least one embodiment, the barb 520 and/or the cap 500 can be metal and/or the valve body 200 can be a resilient material. In at least one embodiment, the barb 520 can deform the valve body 200, such as while being press-fit therein, thereby sealing the cap 500 to the valve body 200.

In at least one embodiment, the cap 500 can include one annular barb 520 that extends around a perimeter of the cap 500. In at least one embodiment, the cap 500 can include two or more annular barbs 520 that extend around a perimeter of the cap 500. In at least one embodiment, the barbs 520 can resist pressure within the valve body 200 to hold the cap 500 in place within or relative to the valve body 200.

In at least one embodiment, a valve 100 according to the disclosure can include one or more stops 600 press-fit at least partially into the valve body 200 at an end of the valve body 200, such as at the coil section 230 of the valve body 200. In at least one embodiment, the stop 600 can include one or more shafts 610 to limit movement of the plunger 300 away from (i.e., in a direction away from) the cap 500 and/or a flange 612, which can fix a position of the stop 600 with respect to the valve body 200. In at least one embodiment, the stop 600 can include one or more annular barbs 620 that sealingly mates with the valve body 200. In at least one embodiment, the barb 620 can extend around a perimeter of the stop 600. In at least one embodiment, the barb 620 can extend around a perimeter of the shaft 610 and/or the flange 612. In at least one embodiment, the barb 620 can resist pressure within the valve body 200 to hold the stop 600 in place within or relative to the valve body 200. In at least one embodiment, the annular barb(s) 620 can allow a position of the stop 600 within or relative to the valve body 200 to be adjusted, such that the stop 600 can be mounted along a range of positions along the valve body 200. Adjusting the position of the stop 600 within or relative to the valve body 200 can adjust the stroke of the plunger 300, and/or reduce stacked tolerances in the valve 100.

In at least one embodiment, the barb 620 can be integral with the stop 600 and/or can hermetically or fluidically seal the stop 600 to the valve body 200, which can include doing so singlehandedly, such as without the aid of an additional sealing device, such as an O-ring, gasket, or sealant. In at least one embodiment, the barb 620 and/or the stop 600 can be metal and/or the valve body 200 can be a resilient material. In at least one embodiment, the barb 620 can be configured to deform the valve body 200, such as while being press-fit therein, thereby sealing the stop 600 to the valve body 200.

In at least one embodiment, the stop 600 can include one or more annular barbs 620 that extend around a perimeter of the stop 600. In at least one embodiment, the stop 600 can include two or more annular barbs 620 that extend around a perimeter of the stop 600. In at least one embodiment, the barbs 620 can resist pressure within the valve body 200 and/or can hold the stop 600 in place within or relative to the valve body 200.

In at least one embodiment, a valve 100 according to the disclosure can include one or more valve bodies 200 having a port section 210 and a coil support section 230 extending along a longitudinal axis, a plunger 300 within the valve body 200 and extending at least partially through the coil support section 230, a cap 500 press-fit at least partially into the valve body 200 at a first end of the valve body 200, a stop 600 press-fit at least partially into the valve body 200 at a second, opposite end of the valve body 200, or any combination thereof. In at least one embodiment, the cap 500 can include a valve seat 540 configured to be selectively engaged by a poppet 400 mounted to the plunger 300 to selectively open and close a flow path through the port section 210 of the valve body 200. In at least one embodiment, the cap 500 can include one or more first annular barbs 520 extending around a perimeter of the cap 500, which can sealingly secure the cap 500 at least partially within the valve body 200. In at least one embodiment, the stop 600 can limit movement of the plunger 300 away from the cap 500. In at least one embodiment, the stop 600 can include one or more second or other annular barbs 620 extending around a perimeter of the stop 600, which can sealingly secure the stop 600 at least partially within the valve body 200.

In at least one embodiment, the first barb 520 can resist pressure within the valve body 200 to hold the cap 500 in place within or relative to the valve body 200. In at least one embodiment, the first barb 520 can be metal. In at least one embodiment, the first barb 520 and the cap 520 can be integrally formed of metal. In at least one embodiment, the valve body 200 can be a resilient material. In at least one embodiment, the first barb 520 can deform the valve body 200, such as while being press-fit therein, thereby sealing the cap 500 to the valve body 200.

In at least one embodiment, the second barb 620 can resist pressure within the valve body 200 to hold the stop 600 in place within or relative to the valve body 200. In at least one embodiment, the barb can be metal. In at least one embodiment, the second barb and the stop can be integrally formed of metal. In at least one embodiment, the valve body can be a resilient material. In at least one embodiment, the second barb can deform the valve body, such as while being press-fit therein, thereby sealing the stop 600 to the valve body.

Utilizing barbs 520, 620 on the cap 500 and/or stop 600, any of which can be metallic, advantageously provides retention and/or hermetic sealing within the valve body 200, which can be plastic or polymer, that requires no additional parts to function, reduces the number of parts required, reduces time and/or effort required for assembly, allows for positional fixation and/or adjustment within the valve body 200, or any combination thereof. In at least one embodiment, the cap 500 can include two or more barbs 520 to prevent angular misalignment of the valve seat 540 to the valve body 200 and/or plunger 400. In at least one embodiment, heat can be used to shrink, stake, and/or further couple or seal the valve body 200 to the cap 500 and/or the stop 600.

In at least one embodiment, a valve 100 according to the disclosure can include one or more valve bodies 200 having a port section 210 and a coil support section 230 extending along a longitudinal axis, a plunger 300 within the valve body 200 and extending at least partially through the coil support section 230, a poppet 400 press-fit onto the plunger 300, or any combination thereof. In at least one embodiment, the body 200 can include one or more first valve seats 240. In at least one embodiment, the plunger 300 can include a stem 310 extending through the first valve 240 seat into the port section 210. In at least one embodiment, the poppet 400 can be press-fit onto the stem 310 of the plunger 400. In at least one embodiment, the poppet 400 can selectively engage the first valve seat 240 to open and close a first flow path through the port section 210 of the valve body 200. In at least one embodiment, a stroke of the plunger 300 and/or a flow rate through the first flow path can be adjusted by adjusting a first position of the poppet 400 on the plunger 300.

In at least one embodiment, a valve 100 according to the disclosure can include one or more caps 500 press-fit at least partially into the port section 210 of the valve body 200. In at least one embodiment, the cap 500 can include one or more second valve seat 540. In at least one embodiment, the poppet 400 can selectively engage the second valve seat 540 to open and close a second flow path through the port section 210 of the valve body 200. In at least one embodiment, a stroke of the plunger 300 and/or a flow rate through the second flow path can be adjusted by adjusting a second position of the cap 500 in or relative to the body 200.

In at least one embodiment, a method of assembling a valve 100 according to the disclosure can include monitoring a first flow, of fluid flow, between a first port and a second port of the valve 100 and/or pressing a poppet 400 onto a plunger 300 of the valve 100 until the first flow stops. In at least one embodiment, a method of assembling a valve 100 according to the disclosure can include monitoring a second fluid flow between the first port and a third port of the valve 100, energizing a coil 234 of the valve 100, pressing a cap 500 into a body 200 of the valve 100 until the second fluid flow stops, or any combination thereof. In at least one embodiment, a method of assembling a valve 100 according to the disclosure can include monitoring a second fluid flow between the first port and a third port of the valve 100 and/or pressing a cap 500 into a body 200 of the valve 100 until a target rate of the second fluid flow is achieved, which can be or include any flow rate required or desired according to an implementation of the disclosure. In at least one embodiment, the first port can be a common port. In at least one embodiment, the second port can be a normally closed port. In at least one embodiment, the third port can be a normally open port.

In at least one embodiment, an assembly system or apparatus 700, such as that shown in FIG. 20 for exemplary purposes, can be used to provide a controlled fluid flow to/from one or more ports of the port section 210 of the valve body 200 during assembly of valve 100. In at least one embodiment, such fluid flow can be of air, another inert gas, water, another inert fluid, or any combination thereof. In at least one embodiment, the system 700 can be or include a pneumatic system, one or more assembly fixtures (not shown) and one or more presses or pressing machines (not shown), such as a dynamic precision press capable of precision pressing of components based on closed loop sensor feedback. In at least one embodiment, the system 700 can one or more supply pressure inlets, one or more solenoid valves (e.g., solenoid valves SV1, SV2, et seq.), one or more pressure regulators (e.g., pressure regulators PR1, PR2), one or more flow meters (e.g., flow meter FM), one or more level meters (e.g., level meter LM), one or more pressure transmitters (e.g., pressure transmitter PT), one or more orifices, one or more valve port connections, one or more vents to atmosphere, or any combination thereof.

In at least one embodiment, a method of assembling a valve 100 according to the disclosure can include monitoring a power consumption of the coil 234 and continuing to press the cap 500 into the body 200 and/or the poppet 400 onto the plunger 300, until the power consumption matches a setpoint, such as a setpoint indicative of the assembly step being complete. By adjusting the position of the cap 500 in or relative to the body 200 and/or the poppet 400 on the plunger 300, power consumption of the coil 234 can be controlled.

In at least one embodiment, a method of assembling a valve 100 according to the disclosure can include energizing a coil 234 of the valve 100, de-energizing the coil 234 of the valve 100, and monitoring for a sound caused by a plunger 300 of the valve 100 contacting a stop 600 of the valve 100. In at least one embodiment, a method of assembling a valve 100 according to the disclosure can include repeating the steps of pressing the poppet 400 onto the plunger 300, energizing the coil 234 of the valve 100, de-energizing the coil 234 of the valve 100, monitoring for the sound caused by the plunger 300 contacting the stop 600, or any combination thereof, until the sound caused by the plunger 300 contacting the stop 600 is no longer detected. By adjusting the position of the poppet 400 on the plunger 300, the stroke of the plunger 300 can be controlled, such as to limit the engagement between the plunger 300 and the stop 600.

In at least one embodiment, a method of assembling a valve 100 according to the disclosure can include monitoring a first fluid flow between two or more ports, such as a common port 212 and a normally closed port 216 of the valve 100, pressing a poppet 400 onto a plunger 300 of the valve 100 until the first fluid flow stops, monitoring a second fluid flow between the common port 212 and a normally open port 214 of the valve 100, energizing a coil 234 of the valve 100, pressing a cap 500 into a body 200 of the valve 100 until the second fluid flow stops, or any combination thereof. In at least one embodiment, a method of assembling a valve 100 according to the disclosure can include monitoring a power consumption of the coil 234 and/or continuing to press, or repeatedly pressing, the cap 500 into the body 200 and/or the poppet 400 onto the plunger 300, until the power consumption matches a setpoint, which can be or include any setpoint required or desired according to an implementation of the disclosure. In at least one embodiment, a method of assembling a valve 100 according to the disclosure can include energizing the coil 234 of the valve 100, de-energizing the coil 234 of the valve 100, monitoring for a sound caused by a plunger 300 of the valve 100 contacting one or more other components, such as a stop 600 of the valve 100, or any combination thereof. In at least one embodiment, a method of assembling a valve 100 according to the disclosure can include repeatedly pressing the poppet 400 onto the plunger 300, energizing the coil 234 of the valve 100, de-energizing the coil 234 of the valve 100, monitoring for the sound caused by the plunger 300, or any combination thereof, until the sound caused by the plunger 300 is no longer detected, falls below a threshold, or falls within an acceptable range, which can be or include any threshold or range required or desired according to an implementation of the disclosure. In at least one embodiment, the poppet 400 can be pressed onto the plunger 300 before the cap 500 is pressed into the body 200.

In at least one embodiment, a method of assembling a valve 100 can include monitoring a fluid flow between the common port and a normally open port of the valve 100, energizing a coil 234 of the valve 100, pressing a cap 500 into a body 200 of the valve 100 until the fluid flow stops, or any combination thereof. In at least one embodiment, the method can include monitoring a power consumption of the coil 234 and repeating the step of pressing the cap 500 into the body 200, until the power consumption matches a setpoint. In at least one embodiment, the method can include energizing a coil 234 of the valve 100, de-energizing the coil 234 of the valve 100, monitoring for a sound caused by a plunger 300 of the valve 100 contacting a stop 600 of the valve 100, or any combination thereof. In at least one embodiment, the method can include repeating, until the sound caused by the plunger 300 contacting the stop 600 is no longer detected, the steps of pressing a poppet 400 onto the plunger 300, energizing the coil 234 of the valve 100, de-energizing the coil 234 of the valve 100, monitoring for the sound caused by the plunger 300 contacting the stop 600, or any combination thereof. In at least one embodiment, the poppet 400 can be pressed onto the plunger 300 before the cap 500 is pressed into the body 200.

By monitoring flow rates through the port section 210 of the valve 100 while pressing the poppet 400 onto the plunger 300 and/or the cap 500 into the body 200 the position of the poppet 400 on the plunger 300 and/or the cap 500 in the body 200 can be adjusted, thereby reducing, eliminating, or otherwise mitigating the effects of stack-up tolerances in the valve 100, such as those impacting the stroke of the plunger 300. Pressing the poppet 400 further onto the plunger 300 and/or pressing the cap 500 further into the body 200 can adjust the stroke of the plunger 300, flow through the port section of the valve 100, power consumption of the coil 234, operational noise within the valve 100, load and/or preload on the spring 330, or any combination thereof. The assembly method described herein can reduce costs through increased tolerances (i.e., the adjustability reduces the effect of tolerances, thereby allowing for looser tolerances in individual component manufacturing) provide better performance by reducing excess elastomer deformation on the valve seats 240, 540, mitigate against energized leak by conducting a pressing operation until enough elastomer deformation has occurred to adequately seal between the cap 500 and the body 200 and/or between the stop 600 and the body 200, offer precise flow control, offer variability in flow rates without change to orifice size, increase reliability of the valve 100 (e.g., since functionality can be confirmed during assembly), or any combination thereof. Stack-up tolerances can be mitigated through the use of the annular barbs 320, 520, 620 described herein, threaded barbs, parts sorting (such as to counter tolerances), or any combination thereof.

In at least one embodiment, a valve can include a valve body having a port section and a coil support section extending along a longitudinal axis, a plunger within the valve body and extending at least partially through the coil support section, a poppet press-fit onto the plunger, or any combination thereof. In at least one embodiment, the body can include a first valve seat. In at least one embodiment, the plunger can include a stem extending through the first valve seat into the port section. In at least one embodiment, the poppet can selectively engage the first valve seat to open and close a first flow path through the port section of the valve body. In at least one embodiment, a stroke of the plunger can be adjusted by adjusting a position of the poppet on the plunger. In at least one embodiment, a flow rate through the first flow path is configured to be adjusted by adjusting a position of the poppet on the plunger.

In at least one embodiment, the valve can include a cap press-fit at least partially into the port section of the valve body. In at least one embodiment, the cap can include a second valve seat that is configured to be selectively engaged by the poppet to selectively open and close a second flow path through the port section of the valve body. In at least one embodiment, the stroke of the plunger can be adjusted by adjusting a second position of the cap in the body. In at least one embodiment, a flow rate through the second flow path can be adjusted by adjusting a second position of the cap in the body.

In at least one embodiment, a method of assembling a valve can include monitoring a first flow between a first port and a second port of the valve and/or pressing a poppet onto a plunger of the valve until the first flow stops. In at least one embodiment, the method can include monitoring a second fluid flow between the first port and a third port of the valve, energizing a coil of the valve, pressing a cap into a body of the valve until the second fluid flow stops, or any combination thereof. In at least one embodiment, the method can include monitoring a second fluid flow between the first port and a third port of the valve and/or pressing a cap into a body of the valve until a target rate of the second fluid flow is achieved. In at least one embodiment, the first port is a common port, the second port is a normally closed port, and the third port is a normally open port.

In at least one embodiment, the method can include monitoring a power consumption of the coil and repeating the step of pressing the cap into the body, until the power consumption matches a setpoint. In at least one embodiment, the method can include energizing a coil of the valve, de-energizing the coil of the valve, monitoring for a sound caused by a plunger of the valve contacting a stop of the valve, or any combination thereof. In at least one embodiment, the method can include repeating, until the sound caused by the plunger contacting the stop is no longer detected, the steps of pressing the poppet onto the plunger, energizing the coil of the valve, de-energizing the coil of the valve, monitoring for the sound caused by the plunger contacting the stop, or any combination thereof.

In at least one embodiment, a method of assembling a valve can include monitoring a first flow between a common port and a normally closed port of the valve, pressing a poppet onto a plunger of the valve until the first flow stops, monitoring a second fluid flow between the common port and a normally open port of the valve, energizing a coil of the valve, pressing a cap into a body of the valve until the second fluid flow stops, or any combination thereof. In at least one embodiment, the method can include monitoring a power consumption of the coil and repeating the step of pressing the cap into the body, until the power consumption matches a setpoint. In at least one embodiment, the method can include energizing a coil of the valve, de-energizing the coil of the valve, monitoring for a sound caused by a plunger of the valve contacting a stop of the valve, or any combination thereof. In at least one embodiment, the method can include repeating, until the sound caused by the plunger contacting the stop is no longer detected, the steps of pressing the poppet onto the plunger, energizing the coil of the valve, de-energizing the coil of the valve, monitoring for the sound caused by the plunger contacting the stop, or any combination thereof. In at least one embodiment, the poppet can be pressed onto the plunger before the cap is pressed into the body.

In at least one embodiment, a method of assembling a valve can include monitoring a fluid flow between two or more ports of the valve, energizing a coil of the valve, pressing a cap into a body of the valve until the fluid flow stops, or any combination thereof. In at least one embodiment, the method can include monitoring a power consumption of the coil and repeating the step of pressing the cap into the body, until the power consumption matches a setpoint. In at least one embodiment, the method can include energizing a coil of the valve, de-energizing the coil of the valve, monitoring for a sound caused by a plunger of the valve contacting one or more other components, such as a stop of the valve, or any combination thereof. In at least one embodiment, the method can include repeating, until a sound caused by the plunger is no longer detected (or, e.g., falls below a threshold or within an acceptable range), the steps of pressing a poppet onto a plunger of the valve, energizing the coil of the valve, de-energizing the coil of the valve, monitoring for the sound caused by the plunger, or any combination thereof. In at least one embodiment, the poppet can be pressed onto the plunger before the cap is pressed into the body.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

The invention claimed is:

1. A method of assembling a valve, the method comprising:

inserting a stem of a plunger into a body of the valve from a first end of the body;

inserting a poppet into the body from a second end of the body, the second end of the body being longitudinally opposite the first end of the body;

initiating a first fluid flow between a first port of the body and a second port of the body, and through a first valve seat of the body;

monitoring the first fluid flow;

pressing the poppet towards the first end of the body and onto the stem of the plunger until the poppet reaches a first position where the first fluid flow stops; and attaching the poppet to the plunger at the first position where the first fluid flow stops.

2. The method of claim 1, wherein attaching the poppet to the plunger includes coupling an exterior surface of the plunger with an interior surface of the poppet via press-fit.

3. The method of claim 1, further comprising inserting a cap having a second valve seat into the body from the second end of the body;

initiating a second fluid flow between the first port of the body and a third port of the body, and through the cap;

monitoring the second fluid flow;

energizing a coil of the valve;

pressing the cap towards the first end of the body and into the body of the valve until the cap reaches a second position where the poppet engages the second valve seat and the second fluid flow stops; and attaching the cap to the body at the second position where the poppet engages the second valve seat and the second fluid flow stops.

4. The method of claim 3, wherein attaching the cap to the body includes sealingly coupling an exterior surface of the cap with an interior surface of the body of the valve via press-fit.

5. The method of claim 3, further comprising
monitoring a power consumption of the coil; and
repeating the step of pressing the cap into the body of the valve until the power consumption matches a setpoint.

6. The method of claim 1, further comprising
inserting a cap having a second valve seat into the body from the second end of the body;
initiating a second fluid flow between the first port of the body and a third port of the body, and through the cap;
monitoring the second fluid flow; and
pressing, using linear pressure, the cap towards the first end of the body and into the body of the valve until cap reaches a second position where the poppet engages the second valve seat and a target rate of the second fluid flow is achieved; and
attaching the cap to the body at the second position where the poppet engages the second valve seat and the target rate of the second fluid flow is achieved.

7. The method of claim 6, wherein attaching the cap to the body includes sealingly coupling an exterior surface of the cap with an interior surface of the body of the valve via press-fit.

8. The method of claim 6, further comprising
monitoring a power consumption of the coil; and
repeating the step of pressing the cap into the body until the power consumption matches a setpoint.

9. The method of claim 1, further comprising
de-energizing the coil of the valve; and
monitoring for a sound caused by a plunger of the valve contacting a stop of the valve.

10. The method of claim 9, further comprising
repeating, until the sound caused by the plunger contacting the stop is no longer detected, the steps of
pressing the poppet towards the first end of the body and onto the stem of the plunger;
energizing the coil of the valve;
de-energizing the coil of the valve; and
monitoring for the sound caused by the plunger contacting the stop.

11. A method of assembling a valve, the method comprising:
initiating a first fluid flow between a common port and a normally closed port of the valve;
monitoring the first fluid flow with a flow meter;
aligning a poppet with a plunger of the valve;
linearly pressing the poppet onto the plunger of the valve until the poppet engages a first valve seat and the first fluid flow stops;
initiating a second fluid flow between the common port and a normally open port of the valve;
monitoring the second fluid flow with the flow meter;
energizing a coil of the valve to disengage the poppet from the first valve seat; and
linearly pressing a cap having a second valve seat into a body of the valve until the poppet engages the second valve seat and the second fluid flow stops.

12. The method of claim 11, further comprising
measuring an electrical power consumption of the coil; and
repeating the step of linearly pressing the cap into the body until the electrical power consumption matches a setpoint.

13. The method of claim 9, further comprising
de-energizing the coil of the valve; and
monitoring for a sound caused by a plunger of the valve contacting a stop of the valve.

14. The method of claim 13, further comprising
repeating, until the sound caused by the plunger contacting the stop is no longer detected, the steps of
linearly pressing the poppet onto the plunger;
energizing the coil of the valve;
de-energizing the coil of the valve; and
monitoring for the sound caused by the plunger contacting the stop.

15. The method of claim 14, wherein the steps of claim 11 are performed before the step of pressing the cap into the body.

16. A method of assembling a valve, the method comprising:
initiating a fluid flow between a common port and a normally open port of the valve;
energizing a coil of the valve to dispose a poppet of the valve in an energized position; and
pressing a cap having a valve seat into a body of the valve until the valve seat engages the poppet and the fluid flow stops;
wherein pressing the cap into the body of the valve includes sealingly coupling an exterior surface of the cap with an interior surface of the body of the valve via press-fit.

17. The method of claim 16, further including
monitoring a power consumption of the coil; and
repeating the step of pressing the cap into the body until the power consumption matches a setpoint.

18. The method of claim 16, further including
energizing the coil of the valve;
de-energizing the coil of the valve; and
monitoring for a sound caused by a plunger of the valve contacting a stop of the valve.

19. The method of claim 18, further including
repeating, until the sound caused by the plunger contacting the stop is no longer detected, the steps of
pressing a poppet onto a plunger of the valve;
energizing the coil of the valve;
de-energizing the coil of the valve; and
monitoring for the sound caused by the plunger contacting the stop.

20. The method of claim 19, wherein the steps of claim 19 are performed before the step of pressing the cap into the body.

* * * * *